(12) United States Patent
Noh et al.

(10) Patent No.: US 12,704,631 B2
(45) Date of Patent: Aug. 11, 2026

(54) VEHICLE LIDAR SYSTEM AND OBJECT DETECTION METHOD THEREOF

(71) Applicants: Hyundai Motor Company, Seoul (KR); Kia Corporation, Seoul (KR)

(72) Inventors: Mi Rim Noh, Jeonju (KR); Yo Han Sung, Goyang (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 926 days.

(21) Appl. No.: 18/071,311

(22) Filed: Nov. 29, 2022

(65) Prior Publication Data

US 2023/0280466 A1 Sep. 7, 2023

(30) Foreign Application Priority Data

Mar. 3, 2022 (KR) ........................ 10-2022-0027409

(51) Int. Cl.
*G01S 17/89* (2020.01)
*G01S 17/66* (2006.01)
*G06V 20/58* (2022.01)

(52) U.S. Cl.
CPC .............. *G01S 17/89* (2013.01); *G01S 17/66* (2013.01); *G06V 20/58* (2022.01)

(58) Field of Classification Search
CPC ........ G01S 17/89; G01S 17/66; G01S 7/4802; G01S 7/4808; G01S 17/931; G06V 20/58; G06V 20/64; G06V 10/457; G06V 10/469; B60W 40/02; B60W 2420/408; B60W 2554/20; B60W 2554/40; G06T 7/11
See application file for complete search history.

(56) References Cited

U.S. PATENT DOCUMENTS 11,475,775 B2 * 10/2022 Ito ............................ G08G 1/20
2021/0312633 A1 * 10/2021 Noh ..................... G06V 10/443
2022/0179076 A1 * 6/2022 Noh ........................ G01S 17/89

OTHER PUBLICATIONS

Andres et al. "Fully automatic spatiotemporal segmentation of 3D LiDAR time series for the extraction of natural surface changes" (Year: 2021).*
Samet et al. "A new approach to the reconstruction of contour lines extracted from topographic maps" (Year: 2012).*
Lo et al "Structure Line Detection From LiDAR Point Clouds Using Topological Elevation Analysis" (Year: 2012).*

* cited by examiner

*Primary Examiner* — Assres H Woldemaryam
(74) *Attorney, Agent, or Firm* — Fox Rothschild LLP

(57) ABSTRACT

An object detection method of a vehicle lidar system according to an embodiment includes, in a contour of an object to be separated formed by connecting peak points among point data of the object to be separated, determining a contour line in which a connecting section of a contour line connecting the peak points includes point data equal to or less than a reference, and setting a separation reference line for separating the contour of the object to be separated into two regions while passing through the contour line including the point data equal to or less than the reference to recognize point data of the two regions as respective objects.

18 Claims, 22 Drawing Sheets

VEHICLE LIDAR SYSTEM AND OBJECT DETECTION METHOD THEREOF

CROSS-REFERENCE TO RELATED APPLICATIONS

The present application claims under 35 U.S.C. § 119(a) the benefit of Korean Patent Application No. 10-2022-0027409, filed on Mar. 3, 2022, which is hereby incorporated by reference as if fully set forth herein.

BACKGROUND

Technical Field

Embodiments relate to a vehicle lidar system and an object detection method thereof.

Discussion of the Related Art

Light Detecting and Ranging (LiDAR) has been developed to construct and visualize geographic data for constructing three-dimensional GIS (geographic information system) information. A lidar system may estimate the location of a host vehicle using a point cloud obtained through a lidar sensor and may assist a driving function by obtaining information on objects around the host vehicle.

If information on an object recognized using the lidar sensor may be inaccurate, the reliability of autonomous driving may be lowered and safety of a driver may be threatened. Accordingly, research to increase the accuracy of object detection may be continuously performed.

SUMMARY OF THE DISCLOSURE

An object of embodiment may be to provide a vehicle lidar system and an object detection method thereof which may prevent two adjacent objects from being misrecognized as one object during object recognition using a lidar sensor.

It will be appreciated by persons skilled in the art that the object that could be achieved with embodiments may not be limited to what has been particularly described hereinabove and the above and other objects embodiments could achieve will be more clearly understood from the following detailed description.

To achieve these objects and other advantages and in accordance with embodiments, as embodied and broadly described herein, an object detection method of a vehicle lidar system includes, receiving point data, forming a contour of an object to be separated by connecting peak points among point data of the object to be separated, determining a contour line in the contour of the object to be separated in which a connecting section of a contour line connecting the peak points includes point data equal to or less than a reference, and setting a separation reference line for separating the contour of the object to be separated into two regions while passing through the contour line including the point data equal to or less than the reference to recognize point data of the two regions as respective objects.

For example, the object detection method may further include generating a contour based on all point data included in the recognized objects, selecting objects in which at least a part of the contour may be included in a region of interest (ROI) of a host vehicle, selecting objects having sizes equal to or greater than a reference size among the objects included in the region of interest (ROI) of the host vehicle, and selecting an object having one or more points between a first point and an end point of the contour among the objects having sizes equal to or greater than the reference size as the object to be separated.

For example, the determining of the contour line including the point data equal to or less than the reference may include determining a break point included in the contour of the object to be separated, determining, based on the break point, a first peak point and a second peak point connecting the contour line including the point data equal to or less than the reference, and extracting the first point, the end point, and the first and second peak points of the contour of the object to be separated as four peak points.

For example, the determining of a break point included in the contour of the object to be separated may include determining whether a straight line connecting the first point and the end point of the contour of the object to be separated may be a diagonal line, checking whether points of the contour of the object to be separated may be present in one direction with respect to the diagonal line, selecting a point farthest from the first point and the end point as a first peak point candidate, calculating a variance of distances between the straight line connecting the first point and the first peak point and points on the contour present between the first point and the first peak point and calculating a variance of distances between the straight line connecting the first peak point and the end point and points on the contour present between the first peak point and the end point, and determining that the contour of the object to be separated has two break points if variance values of the straight line connecting the first point and the first peak point and the straight line connecting the first peak point and the end point may be within a range of variance threshold values of reference lines and a range of variance threshold values of non-reference lines, respectively.

For example, the determining of the first peak point and the second peak point connecting the contour line including the point data equal to or less than the reference based on the break point may include determining whether a contour line including point data equal to or less than the reference may be present for a contour in a linear direction having a larger variance value based on the first peak point upon determining that the contour of the object to be separated has the two break points.

For example, if there may be one break point included in the contour of the object to be separated, determining whether a shape of the contour defined by the break point satisfies a concave shape with respect to the host vehicle may include calculating a variance of distances between a straight line connecting the first point of the contour of the corresponding object and the break point and points on the contour present between the first point and the break point, and calculating a variance of distances between a straight line connecting the break point and the end point and points on the contour present between the break point and the end point, with respect to the object to be separated which satisfies the concave shape, and determining whether there may be a contour line including point data equal to or less than the reference for a contour in a linear direction having a smaller calculated variance value.

For example, the determining of a first peak point and a second peak point connecting a contour line including point data less than or equal to the reference based on the break point may include dividing the contour line formed by the two points into a plurality of regions in a direction parallel to the contour line based on the break point, and determining the two points forming the corresponding contour line as the first peak point and the second peak point if the number of regions having no point data among the plurality of regions may be equal to or greater than a reference value.

For example, the setting of a separation reference line for separating the contour of the object to be separated into two regions while passing through the contour line including the point data equal to or less than the reference to recognize point data of the two regions as respective objects may include setting points included in a contour connected from the first point of the contour of the object to be separated to the first peak point as a first point group, setting points included in a contour connected from the second peak point to the end point of the contour of the object to be separated as a second point group, and selecting a straight line passing through a midpoint of the first peak point and the second peak point and not passing through the points of the first point group and the second point group as the separation reference line.

For example, the selecting of the separation reference line may include setting at least two straight lines passing through midpoint of the first peak point and the second peak point and not passing through the points of the first point group and the second point group as separation reference line candidates, and selecting, as the separation reference line, a straight line having an average value of slopes of a straight line having a largest slope and a straight line having a smallest slope among the separation reference line candidates.

For example, recognizing of the point data of the two regions as respective objects may include deleting point data within a reference distance from the separation reference line, grouping the point data of the first region and the point data of the second region divided by the separation reference, and recognizing a first object based on the point data of the first region and recognizing a second object based on the point data of the second region.

For example, the determining of a contour line in which a connection section of a contour line connecting the peak points includes point data equal to or less than a reference may include determining a contour line having a lowest density of point data among contour lines connecting the peak points.

In another exemplary embodiment, a recording medium having recorded thereon a program for executing an object detection method of the vehicle lidar system, the program implementing receiving point data, forming a contour of an object to be separated by connecting peak points among point data of the object to be separated, determining a contour line in the contour of the object to be separated in which a connecting section of a contour line connecting the peak points includes point data equal to or less than a reference, and setting a separation reference line for separating the contour of the object to be separated into two regions while passing through the contour line including the point data equal to or less than the reference to recognize point data of the two regions as respective objects.

In another exemplary embodiment, a vehicle lidar system includes a lidar sensor and an object tracking device configured to recognize objects based on point data obtained through the lidar sensor, upon determining that the recognized objects include an object to be separated, to determine, in a contour of the object to be separated formed by connecting peak points among point data of the object to be separated, a contour line in which a connecting section of a contour line connecting the peak points includes point data equal to or less than a reference, and to set a separation reference line for separating the contour of the object to be separated into two regions while passing through the contour line including the point data equal to or less than the reference to recognize point data of the two regions as respective objects.

For example, the object tracking device may be configured to generate a contour based on all point data included in the recognized objects, select objects in which at least a part of the contour may be included in a region of interest (ROI) of a host vehicle, select objects having sizes equal to or greater than a reference size among the objects included in the region of interest (ROI) of the host vehicle, and select an object having one or more points between a first point and an end point of the contour among the objects having sizes equal to or greater than the reference size as the object to be separated.

For example, the object tracking device may be configured to determine a break point included in the contour of the object to be separated, determine, based on the break point, a first peak point and a second peak point connecting the contour line including the point data equal to or less than the reference, and extract the first point, the end point, and the first and second peak points of the contour of the object to be separated as four peak points.

For example, the object tracking device may be configured to divide the contour line formed by the two points into a plurality of regions in a direction parallel to the contour line based on the break point and determine the two points forming the corresponding contour line as the first peak point and the second peak point if the number of regions having no point data among the plurality of regions may be equal to or greater than a reference value.

For example, the object tracking device may be configured to set points included in a contour connected from the first point of the contour of the object to be separated to the first peak point as a first point group, set points included in a contour connected from the second peak point to the end point of the contour of the object to be separated as a second point group, and select a straight line passing through a midpoint of the first peak point and the second peak point and not passing through the points of the first point group and the second point group as the separation reference line.

For example, the object tracking device may be configured to delete point data within a reference distance from the separation reference line, group the point data of the first region and the point data of the second region divided by the separation reference, recognize a first object based on the point data of the first region, and recognize a second object based on the point data of the second region.

Upon determining that two objects among objects clustered as dynamic objects may be misrecognized as one object, the vehicle lidar system and the object detection method thereof according to an embodiment may analyze contour characteristics of the corresponding objects, detect a part where the two objects may be connected, and separate the two objects from each other to increase the accuracy of object recognition.

In a further embodiment, one or more vehicles may be provided with one or more the vehicle lidar systems including the object tracking device as described herein.

It will be appreciated by persons skilled in the art that the effects that may be achieved with embodiments may not be limited to what has been particularly described hereinabove and other advantages of embodiments will be more clearly understood from the following detailed description.

DETAILED DESCRIPTION OF THE DISCLOSURE

Figure 1:
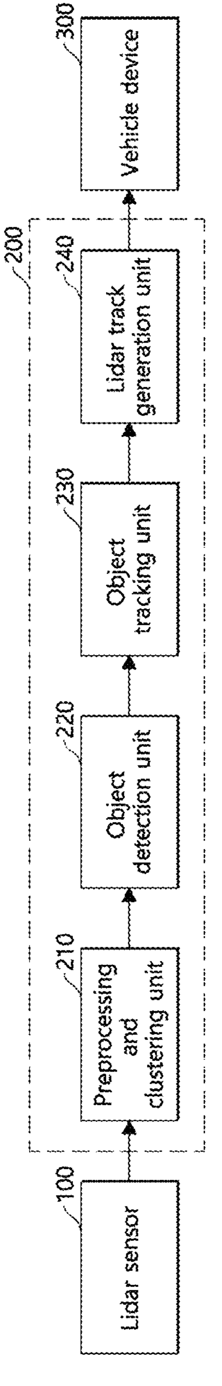
FIG. 1 is a block diagram of a vehicle lidar system according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

The detailed description of the exemplary embodiments of embodiments will be given to enable those skilled in the art to implement and practice embodiments with reference to the attached drawings. However, embodiments may be implemented in various different forms and may not be limited to embodiments described herein. The embodiments may be provided in order to more completely explain embodiments to those of ordinary skill in the art.

In description of embodiments, when an element may be described as being formed on "on" or "under" another element, "on" or "under" includes a case where both elements may be in direct contact with each other or a case in which one or more other elements may be indirectly disposed between the two elements.

In addition, in the case of representation of "on" or "under", it may include the meaning of the downward direction as well as the upward direction based on one element.

Further, relational terms such as "first", "second," "top"/"upper"/"above" and "bottom"/"lower"/"under" used below may be used to distinguish a certain entity or element from other entities or elements without requiring or implying any physical or logical relationship between entities or order thereof.

Throughout the specification, when it may be said that some part "includes" a specific element, this means that the part may further include other elements, not excluding the same, unless mentioned otherwise. In addition, parts that may not be related to description will be omitted for clear description in the drawings, and the same reference numbers will be used throughout this specification to refer to the same or like parts.

In the present embodiment, to solve a problem that two objects that may not be sufficiently far apart from each other may be misrecognized as one object at the time of recognizing objects using a LiDAR sensor, if it may be determined that two objects among objects clustered as dynamic objects may be misrecognized as one object, contour characteristics of the objects may be analyzed, a part where the two objects may be connected may be detected, and the two objects may be separated from each other to improve object recognition performance.

Hereinafter, a vehicle lidar system and an object detection method thereof according to an embodiment will be described with reference to the drawings.

FIG. 1 is a block diagram of a vehicle lidar system according to an embodiment.

Referring to FIG. 1, a lidar system for a vehicle according to an embodiment may include a lidar sensor 100, an object tracking device 200 that processes data obtained from the lidar sensor 100 to output object tracking information regarding tracking of surrounding objects, a vehicle device 300 that controls various functions of the vehicle according to the object tracking information output from the object tracking device 200.

The lidar sensor 100 may be configured to radiate laser pulses to objects and then measure a time taken for laser pulses reflected from an object within a measurement range to return to sense information such as a distance to the object, the direction and speed of the object, etc. Here, the object may be another vehicle, a person, a thing, or the like present outside the vehicle. The lidar sensor 100 may be configured to output a sensing result as lidar data. The lidar data may be output in the form of point cloud data including a plurality of points for a single object.

The object tracking device 200 may be configured to receive lidar data from the lidar sensor 100 to determine presence or absence of an object, recognize the shape of an object to track the object, and classify a recognized object type. The object tracking device 200 may include a preprocessing and clustering unit 210, an object detection unit 220, an object tracking unit 230, and a lidar track generation unit 240.

The preprocessing and clustering unit 210 may be configured to preprocess lidar data received from the lidar sensor 100 into a processable form, and then cluster the lidar data into significant shape units. The preprocessing and clustering unit 210 may be configured to remove points with low intensity or reflectance through filtering using intensity or confidence information of the lidar data and perform a preprocessing process of converting the lidar data such that the lidar data may be suited to a reference coordinate system.

The pre-processing and clustering unit 210 may be configured to group the lidar data into significant units according to a predetermined rule to generate clusters as a grouping result. Clustering may refer to a process of generating each cluster by grouping points that may be assumed to be obtained from the same object. Here, if a separation distance between objects may not be sufficient, the two objects may be misrecognized as one object. For example, when two dynamic objects may be close to each other or a dynamic object and a static object such as a guardrail may be close to each other, points obtained from the two objects may be grouped and output as one cluster.

The object detection unit 220 may be configured to generate information on a plurality of boxes using a clustered result. The object detection unit 220 may be configured to generate a contour using clustered points and determine a shape of an object based on the contour. After detecting a box that fits the shape of the object, the object detection unit 220 may be configured to generate information about the box including the width, length, position, and heading of the box. In the process of detecting an object, the object detection unit 220 may be configured to determine whether the corresponding object may be an object to be separated which satisfies preset conditions. If the object is determined as an object to be separated, the object detection unit 220 may be configured to separate the object by separating a point group into two groups based on a contour of point data of the object.

The object tracking unit 230 may be configured to select a box associated with an object being tracked based on a plurality of pieces of box information output from the object detection unit 220. Here, "association" refers to a process of selecting a box to be used to maintain tracking of a target object currently being tracked from among a plurality of pieces of box information.

The lidar track generation unit 240 may be configured to generate a track according to a target object based on associated boxes and outputs the track to the vehicle device 300.

The vehicle device 300 may be configured to receive a lidar track for each channel from the object tracking device 200 and apply the same to control a driving function.

Figure 2:
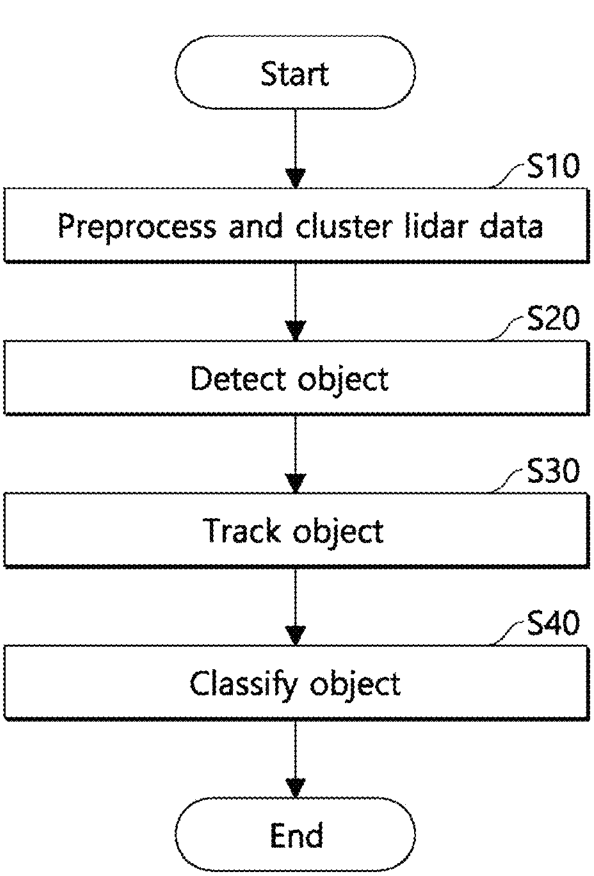
FIG. 2 is a flowchart of an object estimation method of an object tracking device of FIG. 1.

FIG. 2 is a flowchart of an object tracking method of the object tracking device 200 of FIG. 1.

The object tracking device 200 preprocesses point cloud type lidar data received from the lidar sensor 100 into a processable form and then clusters the preprocessed data (S10). The preprocessing and clustering unit 210 may perform a preprocessing of removing ground data from the lidar data and clustering the preprocessed lidar data into significant shape units, that is, point units of parts considered to be the same object.

An object may be detected based on clustered points (S20). The object detection unit 220 may generate a contour by connecting the clustered points, generate a box according to an object shape based on the generated contour and output the box. Here, if two objects may be misrecognized as one object, point groups of the objects may be separated based on contour characteristics of the objects to separate the misrecognized object into the two objects.

An object may be tracked based on the detected object box (S30), and the type of the tracked object may be classified as a car, a two-wheeled vehicle, a pedestrian, or the like (S40).

In the above-described object tracking method using the lidar sensor, the object detection unit 220 according to an embodiment determines whether the detected object may be an object to be separated which satisfies preset conditions. System resources may be saved by limiting an object to be separated to an object that may be adjacent to the host vehicle and has the potential to affect driving of the host vehicle. If the object may be determined as an object to be separated, the object detection unit 220 may separate the object by dividing a point group into two groups based on the contour of the point data of the object.

Figure 3A:
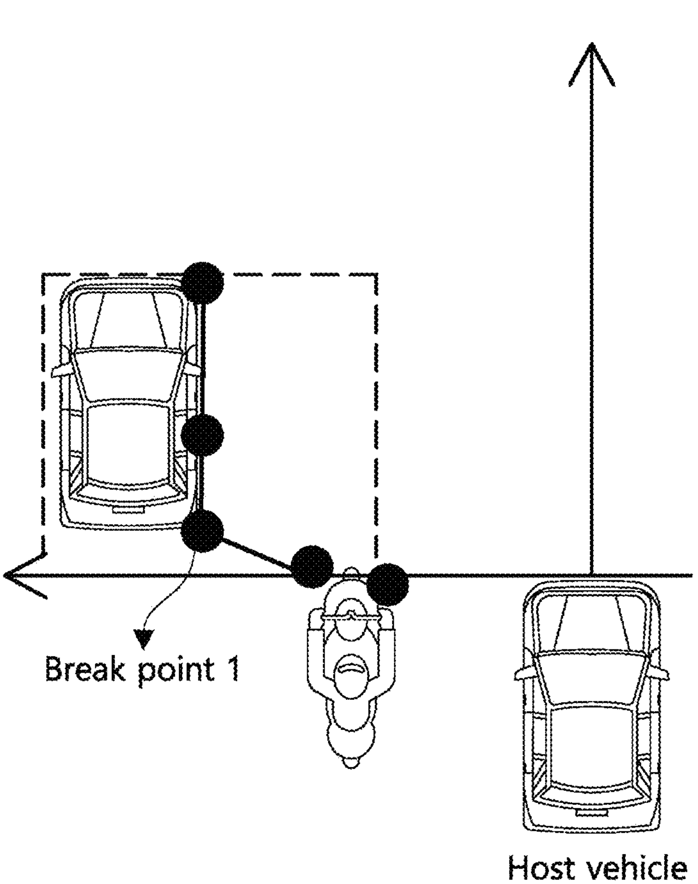
FIGS. 3A and 3B are diagrams illustrating contours extracted from misrecognized objects.
Figure 3B:
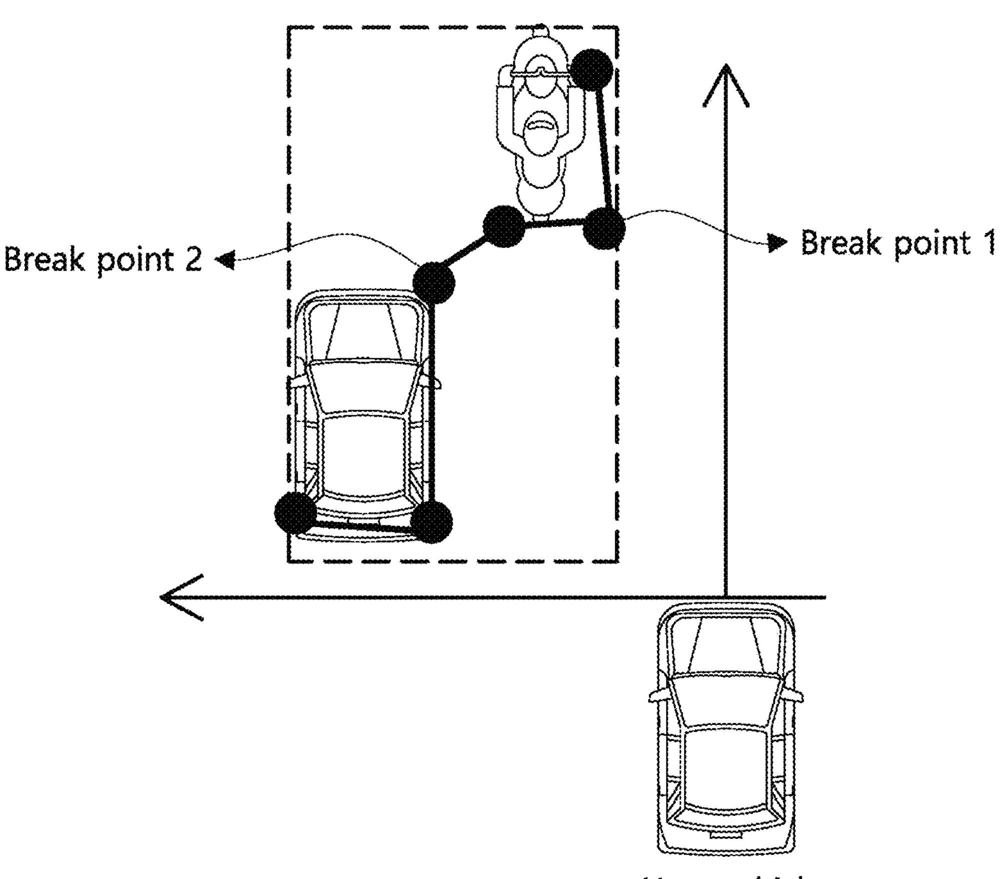

FIGS. 3A and 3B are diagrams illustrating contours extracted from objects misrecognized as one object.

When a passenger vehicle and a two-wheeled vehicle may be located close to each other, point data obtained from the passenger vehicle and point data obtained from the two-wheeled vehicle may be misrecognized as one object. If a contour may be extracted from the box of the misrecognized object, there may be a contour section connecting the two objects. Since points obtained from the different objects may be connected, the direction of the contour may abruptly change in the section. A point at which the direction of the contour abruptly changes, that is, a point at which the contour may be bent, will be referred to as a break point. One or two break points may be acquired according to the positions of the two objects, characteristics of the obtained point data, and the like.

FIG. 3A illustrates a contour having one break point (Break point 1), and FIG. 3B illustrates a contour having two break points (Break point 1 and Break point 2). As shown in FIGS. 3A and 3B, it may be ascertained that a break point may be a point where points of different objects may be connected. Therefore, the two objects may be separated by determining a part where points of different objects may be connected based on break points and separating the points at the part.

Figure 4:
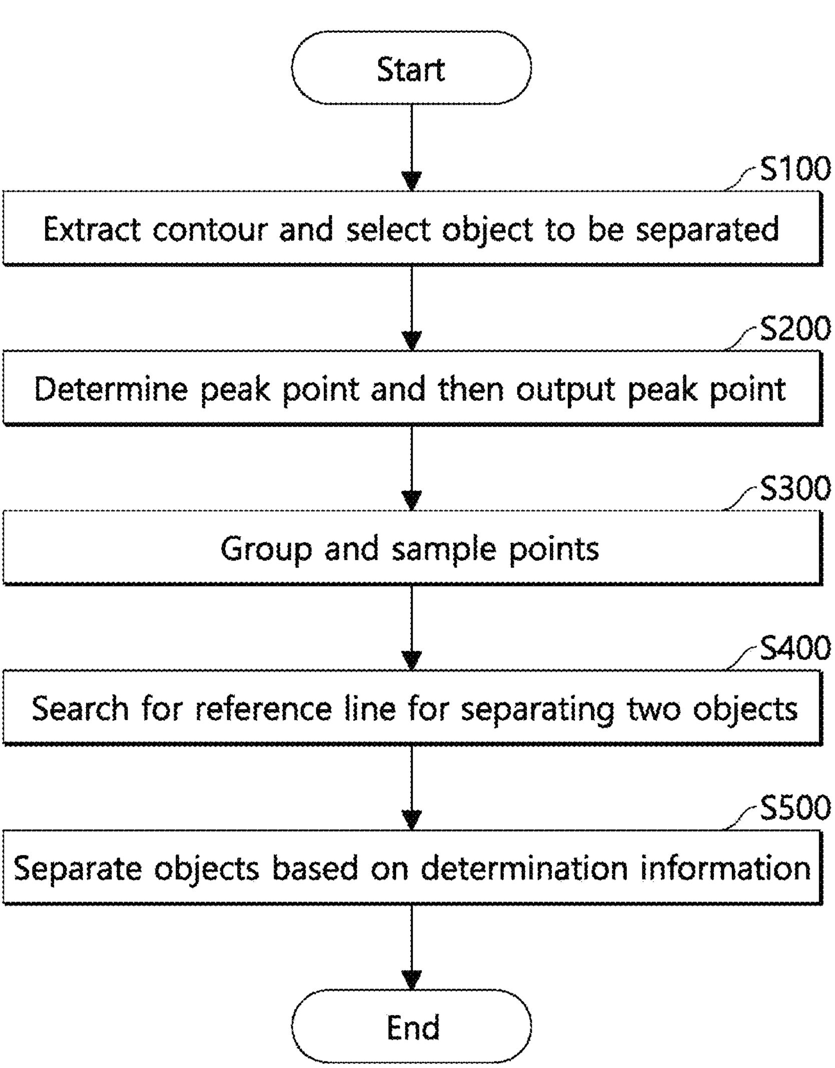
FIG. 4 is a flowchart of an object detection method according to an embodiment.

FIG. 4 is a flowchart of an object detection method according to an embodiment and illustrates a method of separating two objects misrecognized as one object. In the present embodiment, two objects misrecognized as one object among objects adjacent to the host vehicle are determined, and point groups are separated into two groups based on the contour of the misrecognized object to separate the misrecognized object into the two objects.

To this end, a contour is extracted according to a clustered form of point data included in the misrecognized object, and an object to be separated is set by comparing the contour to preset conditions (S100). The contour can be generated using all pieces of point data included in the object such that characteristics of the object can be well represented. The conditions for determining whether an object is an object to be separated may include whether the object is included in a region of interest (ROI) of the host vehicle, whether the box size of the object satisfies criteria for an object to be separated, and whether distribution characteristics of point data satisfy preset criteria.

If an object to be separated is determined, peak points are extracted by analyzing points constituting the contour of the corresponding object (S200). The peak points may include a start point, an end point, and a break point of the contour.

Thereafter, point data is grouped based on the extracted peak points, and points included in each group are sampled (S300).

A reference line for separating two point groups is searched for (S400).

After the point groups are separated based on the determined reference line, boxes fitted to the respective point groups are created to separate the misrecognized object into two objects (S500).

An object misrecognized as one object can be separated into two objects using the above-described object detection method.

Figure 5:
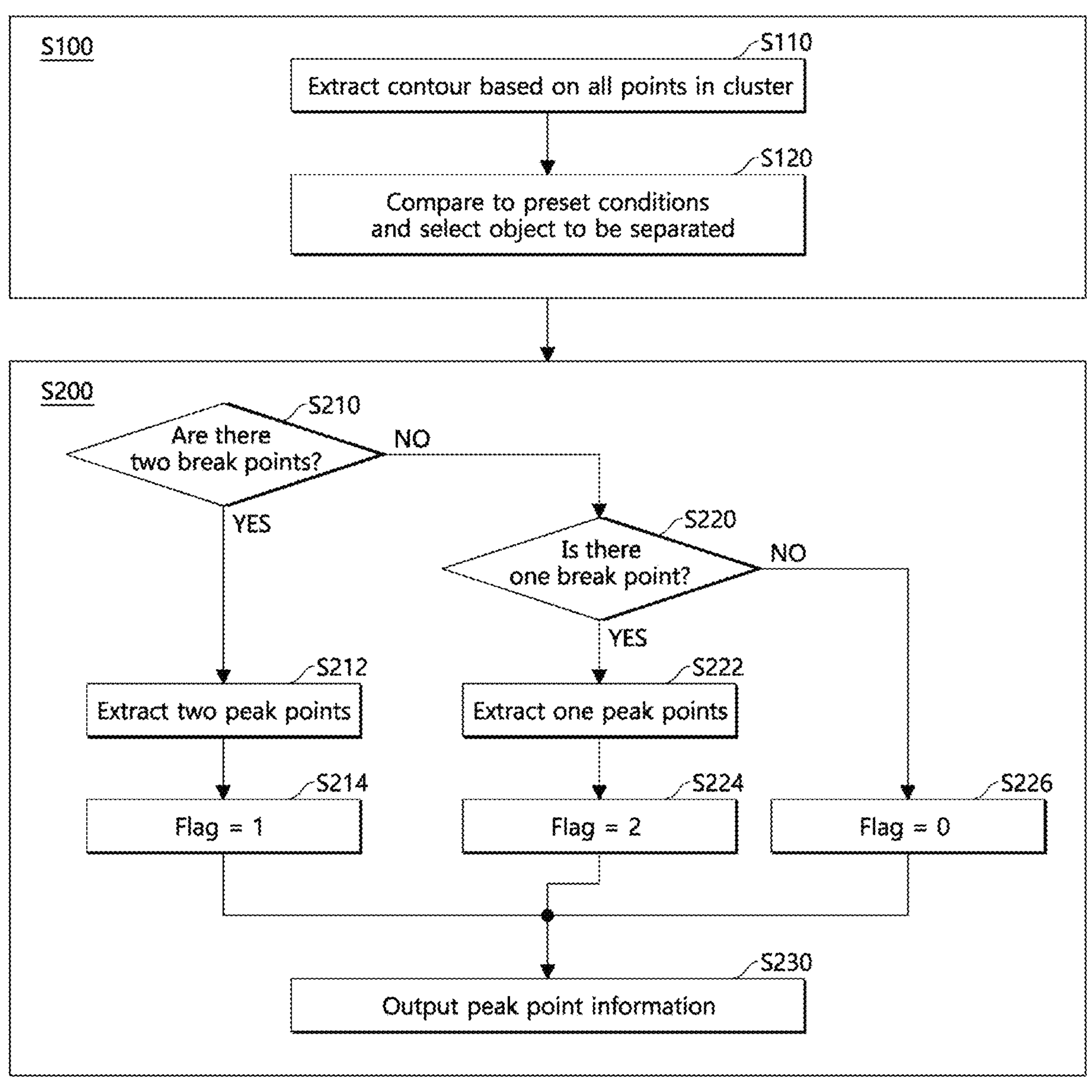
FIG. 5 is a detailed flowchart of a method of selecting an object to be separated and outputting a peak point in steps S100 and S200 of FIG. 4.

FIG. 5 is a detailed flowchart of a method of selecting an object to be separated in step S100 of FIG. 4 and a method of outputting peak points in step S200 of FIG. 4.

Referring to FIG. 5, step S100 is a step of selecting an object to be separated by extracting a contour, and step S200 is a step of outputting peak points of a contour of the object to be separated.

In order to select an object to be separated, first, a contour is extracted based on all points of the object (S110). The contour is a shape in which point data is clustered and may be formed along the outline of the object. By creating the contour based on all pieces of point data within the object, the shape of each object can be well represented even when two objects exist.

Thereafter, an object to be separated is selected by comparing the contour with preset conditions (S120). In the present embodiment, an example in which, when at least a region of an object is present within a region of interest (ROI), the size of the object is equal to or greater than a reference size, and the arrangement of points forming the contour has characteristics of points obtained from two objects, the object is determined as an object to be separated will be described.

Figure 6A:
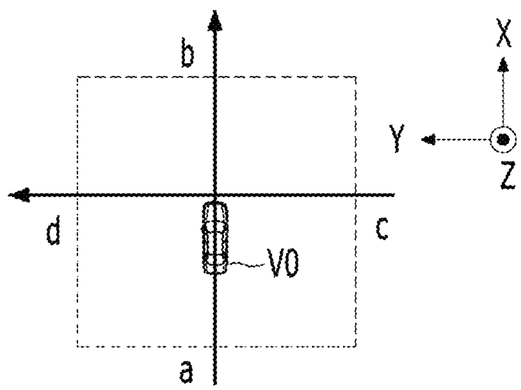
FIG. 6A-6B is a diagram for describing a method of selecting objects to be separated.
Figure 6B:
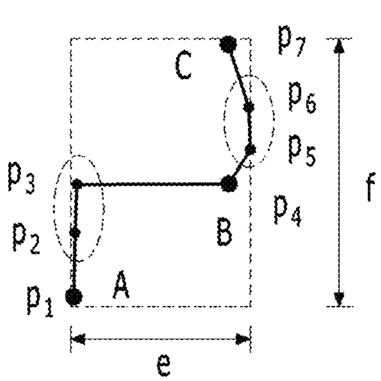

FIGS. 6A-6B are a diagram for describing a method of selecting an object to be separated.

The method of selecting an object to be separated will be described with reference to FIGS. 6A-6B. FIG. 6A is a diagram illustrating an region of interest (ROI), and FIG. 6B is a diagram illustrating a contour extracted from an object and an object box generated based on the contour.

A method of determining whether at least a region of an object is present in a region of interest (ROI) will be described with reference to FIG. 6A. Referring to FIG. 6A, when the traveling direction of a host vehicle V0 is set to the X-axis direction and the direction orthogonal thereto is set to the Y-axis direction, the region of interest (ROI) may be set in a box shape having the host vehicle V0 at the center. For example, the region of interest (ROI) may be set in the form of a square having a length of 20 m in the X-axis direction and 20 m in the Y-axis direction having the host vehicle V0 located at the center. The size of the region of interest (ROI) may vary depending on the type of a road on which the host vehicle is traveling (a highway, a city road, etc.), the condition of the road on which the host vehicle is traveling, etc. An object to be separated must be an object at least a region of which is included in the region of interest (ROI). Accordingly, when at least some of coordinates (X, Y) of points included in the contour satisfy $a \leq X \leq b$ and $c \leq Y \leq d$, the object may be a candidate for an object to be separated.

A method of determining a corresponding object as an object to be separated according to the size of the object and the arrangement of points will be described with reference to FIG. 6B. FIG. 6B is a diagram illustrating a contour extracted from an object and a box generated based on the contour. Objects to be separated are objects that may affect the operation of the host vehicle, such as passenger vehicles and two-wheeled vehicles around the host vehicle. Therefore, if an object created based on the contour has a width equal to or greater than a reference value e (width>e) and a length equal to or greater than a reference value f (Length>f), the object cannot be determined as an object to be separated. The width reference value e may be set to about 0.5 m, and the length reference value f may be set to about 1.0 m. If the width and length of the object created based on the contour are equal to or greater than the reference values, the object may be a candidate for objects to be separated.

In addition, it may be determined whether the object is an object to be separated according to the arrangement of points constituting the contour. As shown in FIG. 6B, based on a start point A, an end point C, and a peak point B located at the longest distance from the points A and B, when a contour from the point A to the point B and a contour from the point B to the point C include one or more points, the corresponding object may be determined as an object to be separated. In the object shown in FIG. 6B, two points P2 and P3 are present between the point A and the point B and two points P5 and P6 are present between the point B and the point C. Accordingly, the object shown in FIG. 6B may be determined as an object to be separated.

Upon determining that the object is an object to be separated through the above process, the process of step S200 of FIG. 5 is performed to detect peak points of the contour and output peak point information.

Referring to FIG. 5, if the object is determined as an object to be separated, it is checked whether the contour includes two break points (S210), and if the contour does not include two break points, it is checked whether the contour includes one break point (S220). A break point means a point at which the contour is bent.

If two break points are identified, each break point is found and two peak points are extracted (S212). When two peak points are extracted, flag information is set to 1 (Flag=1) (S214), and peak point information is output along with the flag information (S230).

If one break point is identified, the corresponding break point is found and one peak point is extracted (S222). When one peak point is extracted, the flag information is set to 2 (Flag=2) (S224), and peak point information is output along with the flag information (S230).

When no break point is identified, the flag information is set to 0 (Flag=0) (S226), and peak point information is output along with the flag information (S230).

Figure 7A:
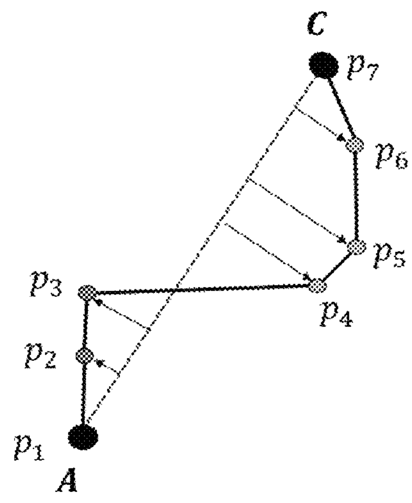
FIGS. 7A-7B and 8A-8B are diagrams for describing a method of determining whether there are two break points and outputting a peak point.
Figure 7B:
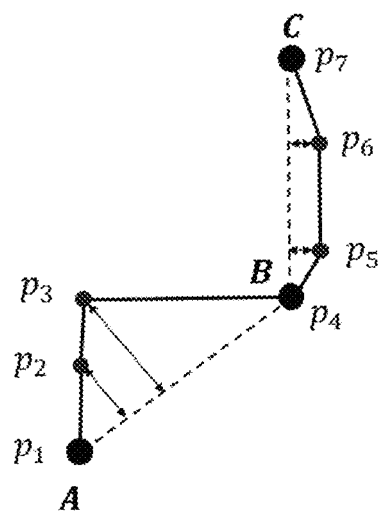
Figure 8A:
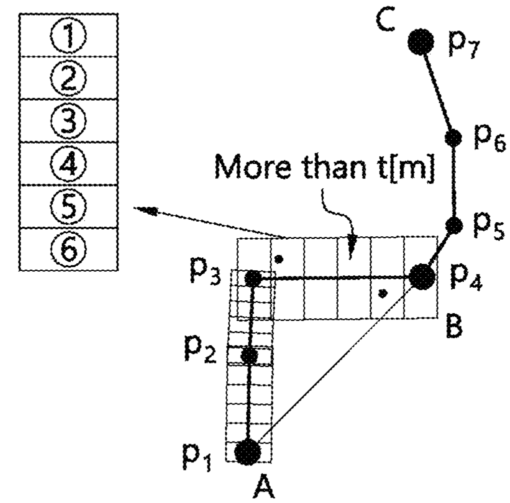
Figure 8B:
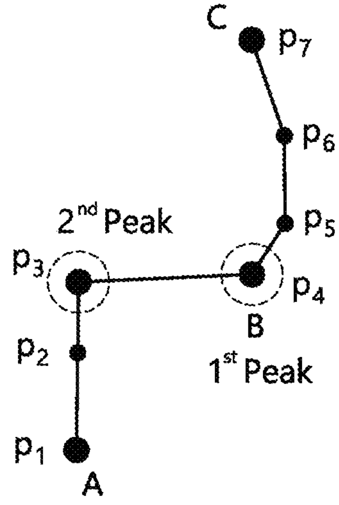

The above-described peak point output method will be described in detail with reference to FIGS. 7A to 15. FIGS. 7A-7B are diagrams for describing a method of determining whether there are two break points in step S210, and FIGS. 8A-8B are diagrams for describing a method of extracting a second peak point when there are two break points in step S212. FIGS. 9 to 14 are diagrams for describing a method of checking whether there is one break point in step S220, and FIG. 15 is a diagram for describing a method of extracting the remaining one peak point when one break point is identified in step S222.

The method of determining whether there are two break points in step S210 of FIG. 5 will be described with reference to FIGS. 7A-7B. To determine whether the contour includes two break points, a sparse flag and a variance flag of point data are checked, and it may be determined that there are two break points upon determining that both the sparse flag and the variance flag meet preset criteria.

Referring to FIG. 7A, a segment AC is set by connecting a first point A and an end point C of a contour in order to check the sparse flag. It is checked whether contour points are present in one direction along the segment AC connecting the first point A and the end point C. Here, the first point A and the end point C need to satisfy positions diagonal to each other. The reason for checking the sparse flag is to reflect the characteristic that contour points are present in one direction along the segment AC connecting the first point A and the end point C when a vehicle is normally recognized.

Referring to FIG. 7B, in order to check the variance flag, a point B that is the farthest from the first point A and the end point C is determined as a first peak point, and then a segment AB and a segment BC are set. When a two-wheeled vehicle and a passenger vehicle are adjacent to each other, a reference line may be generated because a point distribution is not sparse on the side of the passenger vehicle or the side of the two-wheeled vehicle. A reference line refers to a line with a relatively small variance, and a non-reference line refers to a line with a relatively large variance. By extracting a reference line and a non-reference line, it is possible to determine whether an object has two break points.

Referring to FIG. 7B, the point B that is the farthest from the first point A and the end point C is extracted as a peak point, and the segments AB and BC are set. Then, a variance between the segment AB and points P2 and P3 and a variance between the segment BC and points P5 and P6 can be calculated. The variance of the segment AB can be calculated through a method of calculating the average of the distance between the segment AB and the point P2 and the distance between the segment AB and the point P3 and then calculating a difference between the average and the distance between the segment AB and the point P2 and a difference between the average and the distance between the segment AB and the point P3. The variance of the segment BC can also be calculated in the same way based on the difference between the average distance between the segment BC and the points P5 and P6 and differences from the averages. When the variances of the two segments are calculated, the segment BC with a small variance can be selected as a reference line, and the segment AB with a large variance can be selected as a non-reference line. Here, a threshold value of the variance of the reference line and a threshold value of the variance of the non-reference line may be set in advance, and the corresponding object may be determined as an object having two break points if the reference line and the non-reference line satisfy the threshold values. The threshold value of each variance may be set based on simulation result data, previously accumulated data, and the like. For example, the threshold value ($Va \leq VRef \leq Vb$) of the variance VRef of the reference line may be set to between 0 and 0.2 (Va=0, Vb=0.2), and the value ($Vc \leq VNon\text{-}Ref \leq Vd$) of the variance VNon-Ref of the-reference line may be set to between 2 and 15 (Vc=2, Vd=15). Accordingly, when the variance of the segment BC is calculated as a value between 0 and 0.2 and the variance of the segment AB is calculated as a value between 2 and 15, the corresponding object can be determined as an object having two break points.

FIG. 8 is a diagram for describing a method of extracting a second peak point in step S212. Although the point B is assumed as the first peak point in order to extract the reference line and the non-reference line in the previous step, the first peak point may be changed in the process of estimating a break point in step S212.

When different objects are grouped into one object, it is obvious that the density of points between the two objects is lower than those of other areas because there is an empty space between the two objects. The second peak point can be extracted using this feature. In order to extract the second peak point, the length of a segment connecting points and a distribution of points within the corresponding segment may be checked.

Referring to FIG. 8A, the second peak point may be determined by checking segments in a line direction having a large variance, that is, the direction of a segment AB, based on the first peak point B. Since points P4 to P1 are present in the direction of the segment AB, a segment connecting P1 and P2, a segment connecting P2 and P3, and a segment connecting P3 and P4 are present. Among the segments, point distribution can be checked only for segments having lengths equal to or greater than a reference length (t meters (m)).

Among the segments, each segment having a length equal to or greater than the reference length (t m) is divided into K regions, and if there is no point data in n or more regions among the K divided regions, two points of the corresponding segment are determined as the first peak point and the second peak point.

In the method of dividing each segment, the corresponding segment is divided into K equal regions in a direction perpendicular to the segment, and the distance parallel to the segment may be set to L meters (m). FIG. 8A illustrates a case of checking point distribution by setting t=0.5, K=6, and L=0.1. That is, the figure illustrates a case in which a segment having a length of 0.5 m is equally divided into 6 regions, and one divided region is set to 0.1 m such that both ends of the segment are included in region ① and region ⑥. When the distribution of points in the 6 divided regions is checked, P3 is included in region ① and P4 is included in region ⑥. One piece of point data is present in region ② and one piece of point data is present in region ⑤. There is no point data in regions ③ and ④.

For example, when there are no points in two or more regions, if the corresponding segment is set such that two points are determined as the first peak point and the second peak point, the segment connecting P3 and P4 may meet this condition. Accordingly, as shown in FIG. 8B, P4 and P3 may be determined as the first peak point and the second peak point.

On the other hand, if the second peak point is not present even after checking all segments, only the first peak point B that has been initially set is maintained and only the first peak point information is output.

FIGS. 9 to 15 are diagrams for describing a method of determining whether there is one break point and outputting a peak point in step S220 of FIG. 5.

Figure 9:
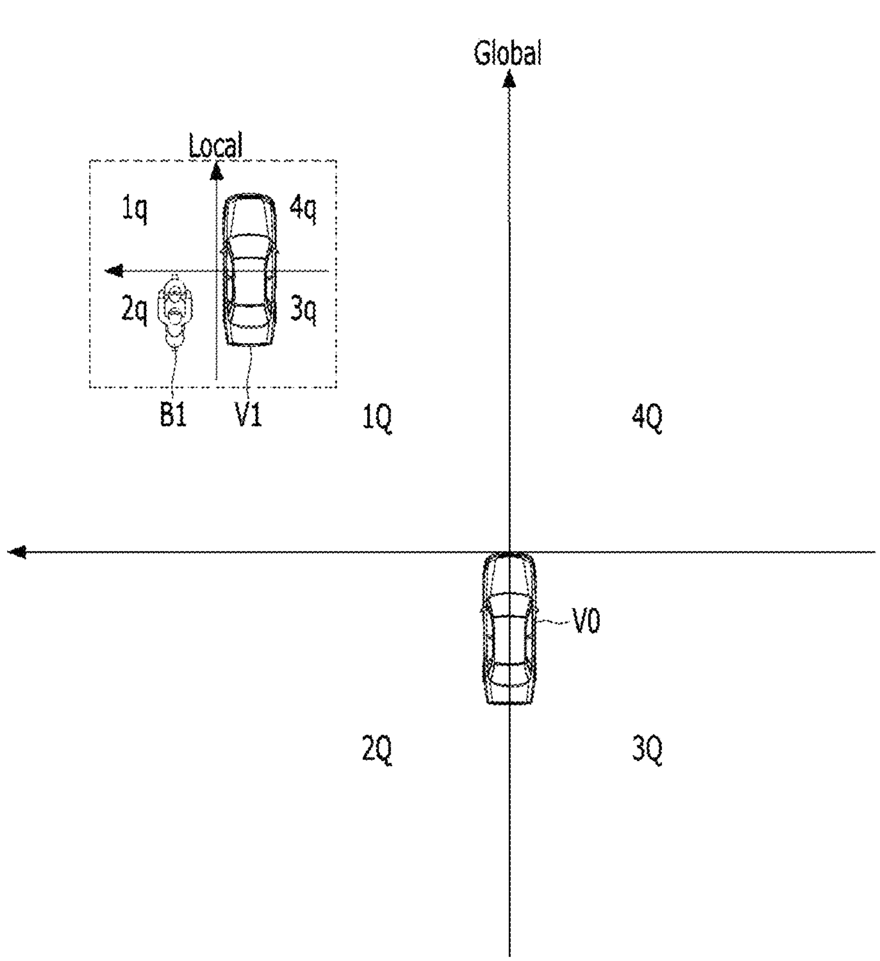
FIGS. 9 to 15 are diagrams for describing a method of determining whether there is one break point and outputting a peak point.

FIG. 9 is a diagram for describing a coordinate system applied to determine whether there is one break point. In the present embodiment, when the shape of a contour defined by peak points of an object may be a concave shape with respect to the host vehicle, the object may be selected as an object to be separated.

When an object having one break point may be determined, a global coordinate system having the host vehicle V0 as an origin and a local coordinate system set in the object may be applied.

The global coordinate system having the host vehicle V0 as the origin has four quadrants: a first quadrant 1Q, a second quadrant 2Q, a third quadrant 3Q, and a fourth quadrant 4Q.

The local coordinate system set in the object has the center of an object box as the origin and has four quadrants: a first quadrant (1q), a second quadrant (2q), a third quadrant (3q), and a fourth quadrant (4q). Peak points of the object may be located in any one of the first to fourth quadrants 1q to 4q of the local coordinate system.

In the present embodiment, when there may be one break point, only a case where a combination of a passenger vehicle and a two-wheeled vehicle may be recognized as one object may be considered. This may be for the purpose of improving system efficiency by performing the object separation process only on misrecognized objects that may affect driving of the host vehicle.

Figure 10:
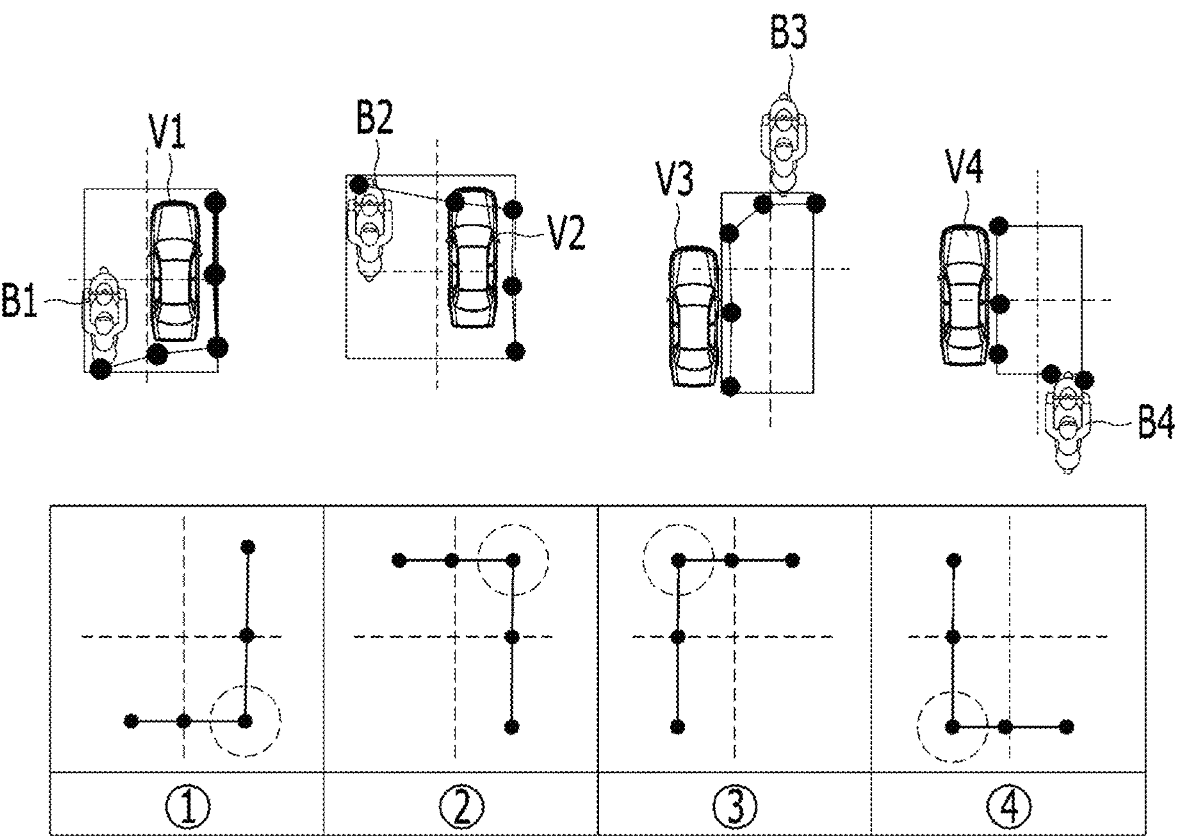

FIG. 10 illustrates arrangement of a passenger vehicle and a two-wheeled vehicle and a contour generated according thereto in a local coordinate system. Combinations of a passenger vehicle and a two-wheeled vehicle adjacently arranged on a road and recognized as one object may include four combinations in which the two-wheeled vehicle may be located behind the left side of the passenger vehicle, in front of the left side of the passenger vehicle, in front of the right side of the passenger vehicle, and behind the right side of the passenger vehicle.

In order to generate a contour of case ①, the two-wheeled vehicle B1 needs to be located behind the left side of the passenger vehicle V1. In case ①, a peak point of the contour may be located in the third quadrant 3q of the local coordinate system.

In order to generate a contour of case ②, the two-wheeled vehicle B2 needs to be located in front of the left side of the passenger vehicle V2. In case ②, a peak point of the contour may be located in the fourth quadrant 4q of the local coordinate system.

In order to generate a contour of case ③, the two-wheeled vehicle B3 needs to located in front of the right side of the passenger vehicle V3. In case ③, a peak point of the contour may be located in the first quadrant 1q of the local coordinate system.

In order to generate a contour of case ④, the two-wheeled vehicle B4 needs to be located behind the right side of the passenger vehicle V4. In case ④, a peak point of the contour may be located in the second quadrant 2q of the local coordinate system.

When cases ① to ④ occur in the global coordinate system having the host vehicle V0 as the origin, the positional relationship between the host vehicle V0, and a passenger vehicle V and a two-wheeled vehicle B varies according to locations of the vehicles in each case on the global coordinate system.

Figure 11:
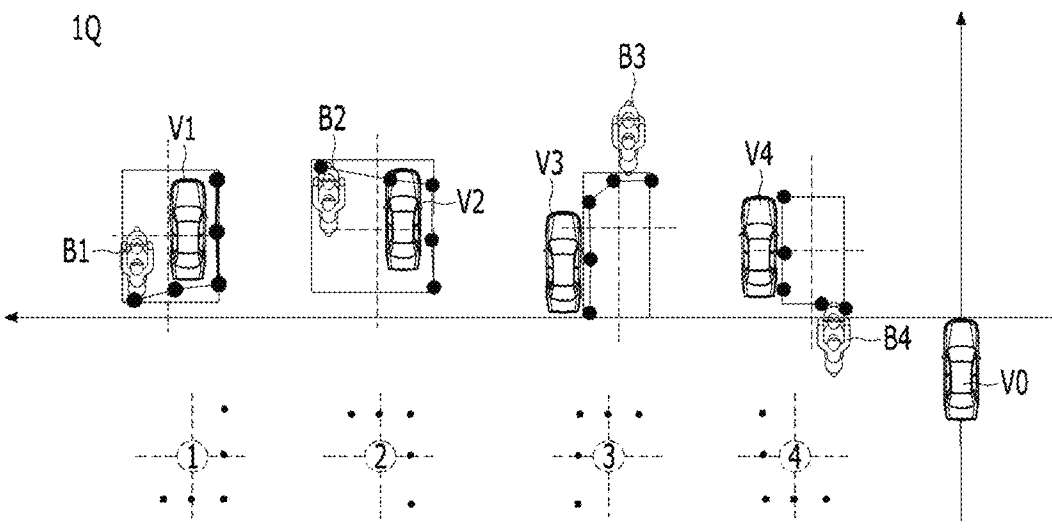
Figure 12:
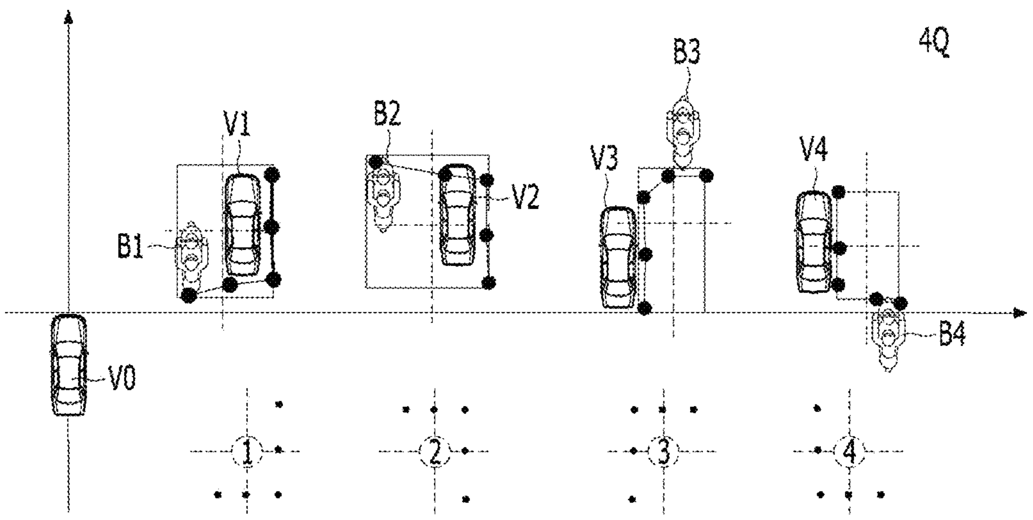

FIGS. 11 and 12 are diagrams for describing a positional relationship between the host vehicle V0, and passenger vehicles V and two-wheeled vehicles B in each case on the global coordinate system.

FIG. 11 illustrates a case in which situations of case ① to case ④ occur in the first quadrant 1Q of the global coordinate system having the host vehicle V0 as the origin.

If two-wheeled vehicles B1 and B2 may be located on the left side of passenger vehicles V1 and V2 in the first quadrant 1Q as in case ① or case ②, the passenger vehicles V1 and V2 may be closer to the host vehicle V0. Since the two-wheeled vehicles B1 and B2 may be covered by the passenger vehicles V1 and V2, it may be considered that the travel routes of the two-wheeled vehicles B1 and B2 do not affect the travel route of the host vehicle V0. Therefore, in the first quadrant 1Q, an object whose one peak point may be located in the third quadrant 3q of the local coordinate system as in case ①, or an object whose one peak point may be located in the fourth quadrant 4q of the local coordinate system as in case ② may be excluded from objects to be separated.

If two-wheeled vehicles B3 and B4 may be located on the right side of passenger vehicles V3 and V4 in the first quadrant 1Q as in case ③ or case ④, the two-wheeled vehicles B3 and B4 may be closer to the host vehicle V0. Accordingly, the travel routes of the two-wheeled vehicles B3 and B4 affect the travel route of the host vehicle V0, and thus the routes of the two-wheeled vehicles B3 and B4 need to be tracked. Therefore, in the first quadrant 1Q, an object whose one peak point may be located in the first quadrant 1q of the local coordinate system as in case ③, or an object whose one peak point may be located in the second quadrant 2q of the local coordinate system as in case ④ may be selected as an object to be separated.

FIG. 12 illustrates a case in which situations of case ① to case ④ occur in the fourth quadrant 4Q of the global coordinate system having the host vehicle V0 as the origin.

If two-wheeled vehicles B1 and B2 may be located on the left side of passenger vehicles V1 and V2 in the fourth quadrant 4Q as in case ① or case ④, the two-wheeled vehicles B1 and B2 may be closer to the host vehicle V0.

Accordingly, the travel routes of the two-wheeled vehicles B1 and B2 affect the travel route of the host vehicle V0, and thus the routes of the two-wheeled vehicles B1 and B2 need to be tracked. Therefore, in the fourth quadrant 4Q, an object whose one peak point may be located in the third quadrant 3q of the local coordinate system as in case ①, or an object whose one peak point may be located in the fourth quadrant 4q of the local coordinate system as in case ② may be selected as an object to be separated.

If two-wheeled vehicles B3 and B4 may be located on the right side of passenger vehicles V3 and V4 in the fourth quadrant 4Q as in case ③ or case ④, the two-wheeled vehicles B3 and B4 may be covered by the passenger vehicles V3 and V4 and thus it may be considered that the travel routes of the two-wheeled vehicles B3 and B4 do not affect the travel route of the host vehicle V0. Therefore, in the fourth quadrant 4Q, an object whose one peak point may be located in the first quadrant 1q of the local coordinate system as in case ③, or an object whose one peak point may be located in the second quadrant 2q of the local coordinate system as in case ④ may be excluded from objects to be separated.

As described above, when situations of case ① to case ④ occur in the global coordinate system, the positional relationship between the host vehicle V0, and a passenger vehicle V and a two-wheeled vehicle B varies according to locations of the vehicles in each case. Accordingly, in the present embodiment, an object may be determined as an object to be separated only in a case where the two-wheeled vehicle B may be closer to the host vehicle V0 than the passenger vehicle V. When the two-wheeled vehicle B may be closer to the host vehicle V0 than the passenger vehicle V, the contour has a concave shape with respect to the host vehicle V0. Accordingly, an object having a contour shape in which one peak point defines a concave shape on each global coordinate system may be selected as an object to be separated.

Figure 13:
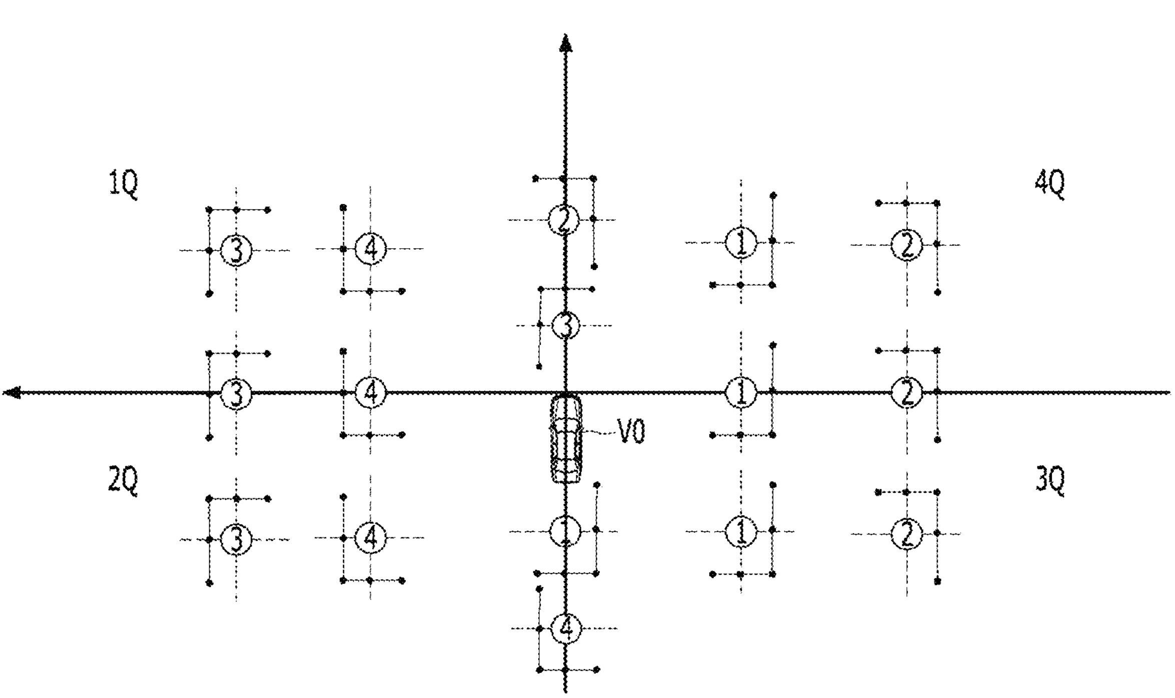

FIG. 13 is a diagram illustrating cases in which an object may be defined as having a concave shape on the global coordinate system and selected as an object to be separated.

Among objects located in the first quadrant 1Q and the second quadrant 2Q of the global coordinate system, objects corresponding to cases ③ and ④ may be selected as objects to be separated. Cases ③ and ④ mean cases in which two-wheeled vehicles B3 and B4 may be located in front of the right side of passenger vehicles V3 and V4 or behind the passenger vehicles V3 and V4 and thus the two-wheeled vehicles B3 and B4 may be closer to the host vehicle V0, but they may be misrecognized as one object. All objects of cases ③ and ④ located in the first quadrant 1Q and the second quadrant 2Q have contours having concave shapes with respect to the host vehicle V0. Among objects located on the X-axis of the global coordinate system, parts belonging to the area of the first quadrant 1Q and the second quadrant 2Q, that is, objects located on the left side of the host vehicle V0 and corresponding to cases ③ and ④ may be selected as objects to be separated.

Among objects located in the third quadrant 3Q and the fourth quadrant 4Q of the global coordinate system, objects corresponding to cases ① and ② may be selected as objects to be separated. Cases ① and ② mean cases in which the two-wheeled vehicles B1 and B2 may be located on the left side of the passenger vehicles V1 and V2 and thus the two-wheeled vehicles B1 and B2 may be closer to the host vehicle V0, but they may be misrecognized as one object. All objects of cases ① and ② located in the third quadrant 3Q and the fourth quadrant 4Q have contours having concave shapes with respect to the host vehicle V0. Among the objects located on the X-axis of the global coordinate system, parts belonging to the area of the third quadrant 3Q and the fourth quadrant 4Q, that is, objects located on the right side of the host vehicle V0 and corresponding to cases ① and ② may be selected as objects to be separated.

Among objects located on the Y-axis of the global coordinate system, in the case of objects located in front of the host vehicle, objects corresponding to case ② and case ③ satisfy a concave contour and thus may be selected as objects to be separated. In the case of objects located behind the host vehicle, objects corresponding to case ① and case ② satisfy the concave contour and thus may be selected as objects to be separated. With respect to the objects on the Y-axis, it may be possible to select objects corresponding to all cases as objects to be separated.

Figure 14:
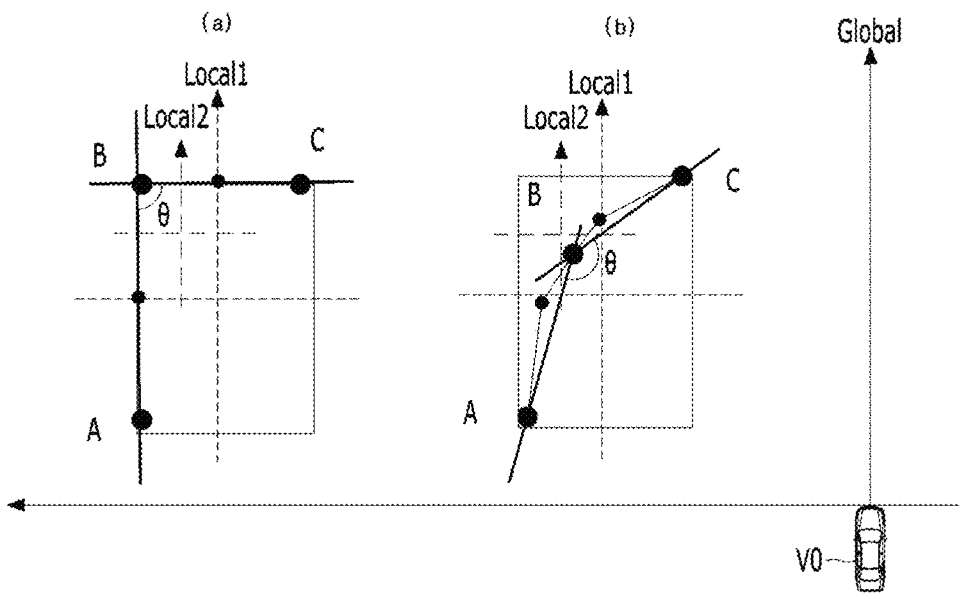
Figure 15:
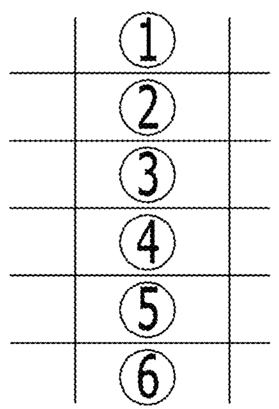
Figure 15:
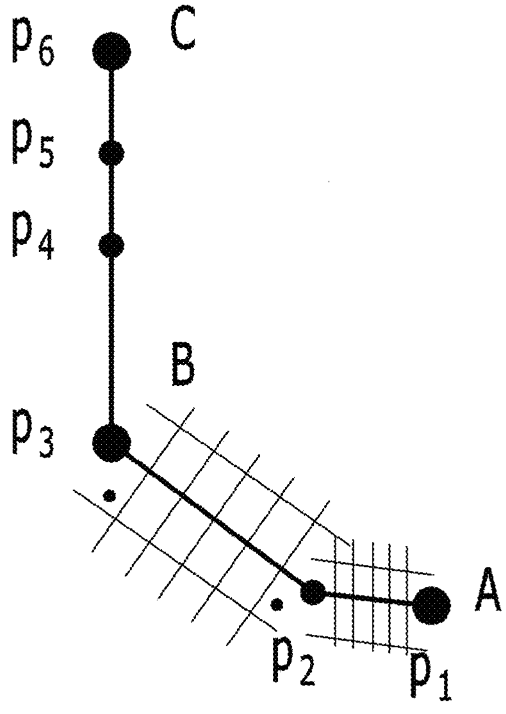

FIG. 14 is a diagram for describing a method of determining a case in which an object satisfying a concave contour needs to be excluded from objects to be separated.

As a case that may occur during driving of the host vehicle, a case in which points obtained from two objects have a concave contour by one peak point may occur in a combination of a passenger vehicle and a guardrail in addition to a combination of a two-wheeled vehicle and a passenger vehicle. If a passenger vehicle and a guardrail may be recognized as one object, they may be excluded from objects to be separated.

Referring to FIG. 14, both the contour shape of (a) and the contour shape of (b) correspond to case ③ in which they may be located in the first quadrant 1Q. The contour shape of case ③ may be obtained when the two-wheeled vehicle may be located in front of the right side of the passenger vehicle. However, a concave contour similar to that of case ③ may also be obtained when points of the passenger vehicle and the guardrail may be combined in addition to a case in which points of the passenger vehicle and the two-wheeled vehicle may be combined.

To determine this, a first local coordinate system may be set for an object located on the global coordinate system to determine the position of a concave peak point, and a second local coordinate system may be set for a quadrant where the concave peak point may be located to determine whether or not to exclude the object from objects to be separated.

Referring to (a) and (b) of FIG. 14, a point B, which may be a concave peak point in the first local coordinate system, may be located in the first quadrant. Accordingly, in the first quadrant of the first local coordinate system in which the point B may be located, the second local coordinate system for dividing the first local coordinate system into four regions may be defined. The origin of the second local coordinate system may be set at the center of an object box located in the first local coordinate system such that the object box located in the first local coordinate system may be divided into four regions. Thereafter, it may be checked how close the point B, which may be the concave peak point, to the origin in the second local coordinate system. If the distance between the point B, which may be the concave peak point, and the origin of the second local coordinate system may be less than a reference distance, the object box may be excluded from objects to be separated.

In (a) of FIG. 14, the point B may be farthest from the origin in the second local coordinate system. Accordingly, the object box of (a) may be determined as an object to be separated.

In (b) of FIG. 14, it may be determined that the distance between the point B and the origin may be less than the reference distance. Upon determining that the distance between the point B and the origin may be less than the reference distance, it may be determined whether an angle θB formed by a segment connecting a start point A and the concave peak point B and a segment connecting an end point C and the concave peak point B may be less than a reference angle. The reference angle θA may be set to about 160 degrees (θA=160°). That is, if the condition of $\angle(\overline{AB}, \overline{BC})<\theta_A(\theta_A=160°)$ may be satisfied, the object box in (b) may be excluded from objects to be separated.

The reference distance for the distance between the point B and the origin and the reference angle for the angle θA between the segment AB and the segment BC, applied in the above-described determination process, may be derived through simulation or trained data.

Upon determining that the corresponding object is an object to be separated having one break point by performing the processes of FIGS. 10 to 14, a second peak point for the one break point may be found (S222 in FIG. 5).

FIG. 15 is a diagram for describing a method of finding a second peak point when there is one break point. Although the point B is assumed as the first peak point in order to determine the concave characteristic in the previous step, the first peak point may be changed in the process of estimating a break point in step S222.

When different objects may be grouped into one object, it may be obvious that the density of points may be lower than those of other areas because there may be an empty space between the two objects. The second peak point may be extracted using this feature. In order to extract the second peak point, the length of a segment connecting points and a distribution of points within the segment may be checked.

The second peak point may be determined by checking segments in a line direction having a large variance based on the first peak point B, that is, in the direction of the segment AB. A method of finding a line direction having a large variance may be the same as the previously described method (refer to FIGS. 7A-7B) and thus it will be omitted.

Since points P3 to P1 may be present in the direction of the segment AB with a large variance, a segment connecting P1 and P2 and a segment connecting P2 and P3 may be present. Among segments, a point distribution can be checked only for segments having lengths equal to or greater than a reference length (t meters (m)).

Among the segments, each segment having a length equal to or greater than the reference length (t meters (m)) may be equally divided into K regions, and if there may be no point data in n or more regions among the K regions, two points of the corresponding segment may be determined as the first peak point and the second peak point.

In the method of dividing each segment, the segment may be equally divided into K regions in a direction perpendicular to the segment, and the distance parallel to the segment may be set to L meters (m). FIG. 15 illustrates a case in which a point distribution may be checked by setting t=0.5, K=6, and L=0.1. That is, the figure illustrates a case in which a segment having a length of 0.5 m may be equally divided into 6 regions, and one divided region may be set to 0.1 m such that both ends of the segment may be respectively included in regions ① and ⑥.

Accordingly, in the segment connecting P1 and P2, P2 may be included in region ① and P1 may be included in region ⑥. In the segment connecting P2 and P3, P3 may be included in region ① and P2 may be included in region ⑥.

When the point distribution in the segment connecting P2 and P3, divided into 6 equal regions may be checked, there may be one piece of point data in region ① including P3, and there may be one piece of point data in region ⑥ including P2. There may be no point data in regions ②, ③, ④, and ⑤ therebetween. If there may be no points in two or more regions, for example, there may be no points in four regions in the segment connecting P2 and P3, and thus the two points P2 and P3 may be determined as the first peak point and the second peak point.

On the other hand, if the second peak point may not be present even after checking all the segments, only the initially set first peak point B may be maintained and only the first peak point information may be output.

Through the above process, it may be possible to extract four pieces of peak point information including a start point, an end point, and both end points of a segment with a small point distribution from an object with two break points and an object with one break point.

Figure 16:
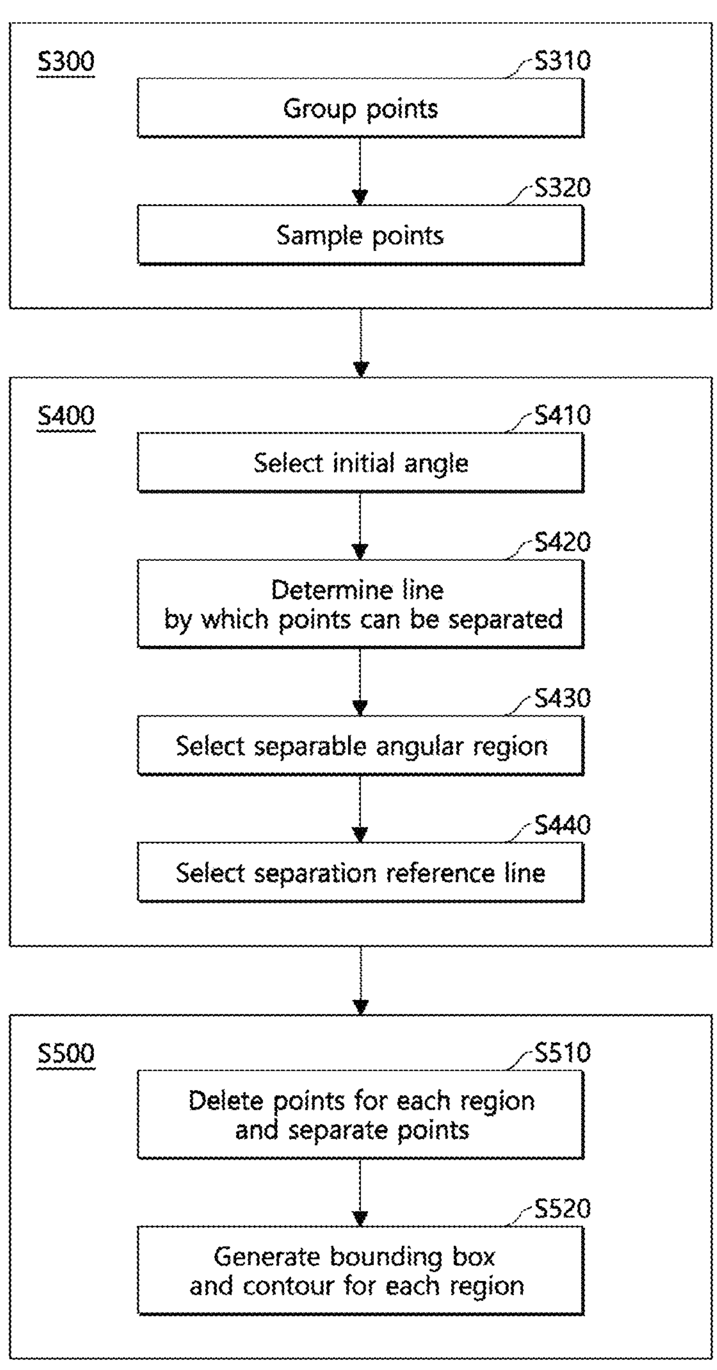
FIG. 16 is a detailed flowchart of a method of separating an object into two objects using peak point information.

FIG. 16 is a detailed flowchart of a method of dividing an object into two objects using four pieces of peak point information extracted from the object (steps S300 to S500 in FIG. 4)).

Step S300 includes step S310 of grouping point data into two groups based on four peak points including a start point, an end point, and both end points of a segment with a small point distribution, and step S312 of sampling points included in each group (S312).

In step S400, a reference line for separating the two point groups from each other is searched. When the two point groups are created, an initial angle is selected in order to separate the two groups from each other (S410), a line by which points can be separated is determined (S420), a separable angular region is selected (S430), and a separation reference line is finally selected (S440).

Step S500 is a step of separating two objects from each other and includes step S510 of deleting points for each region and separating the point groups from each other and step S520 of generating boxes and contours fitted to the separated point groups.

Figures 17A, 17B:
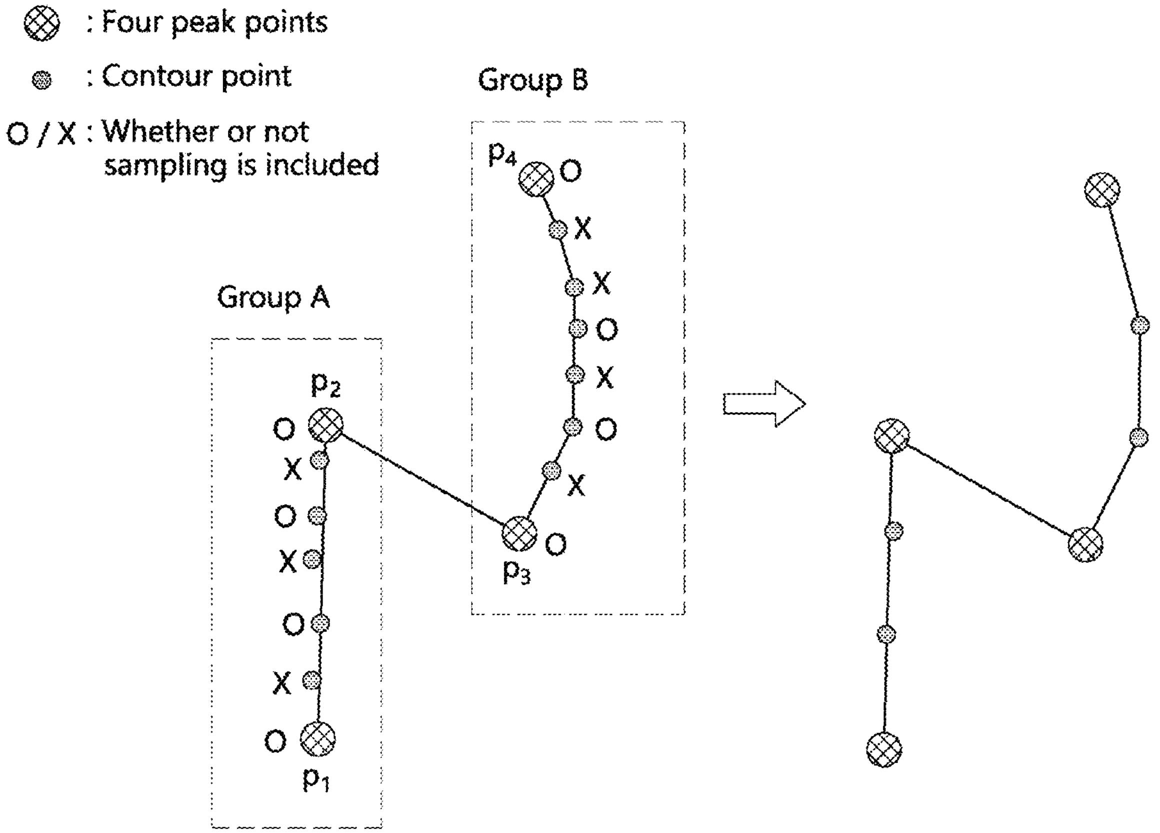
FIGS. 17A-17B to 22 are diagrams for describing a method of separating an object into two objects using peak point information.
Figure 18:
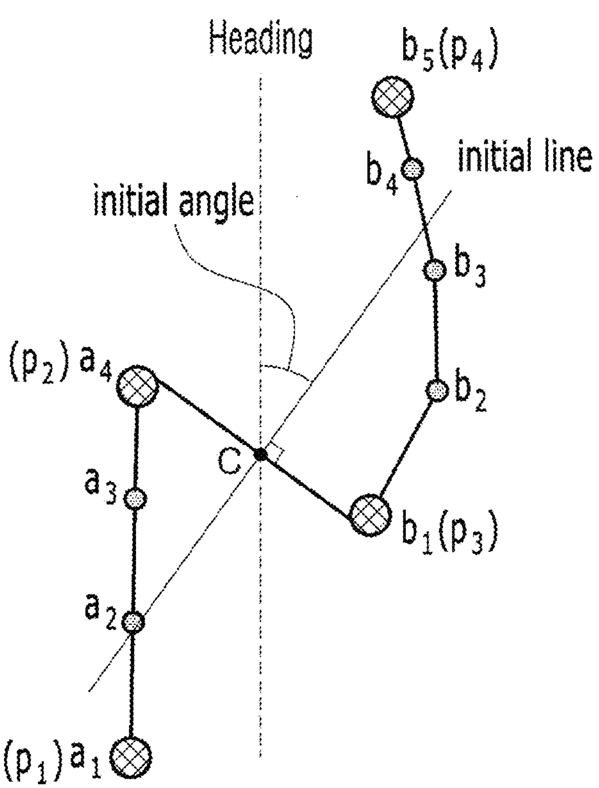
Figure 19:
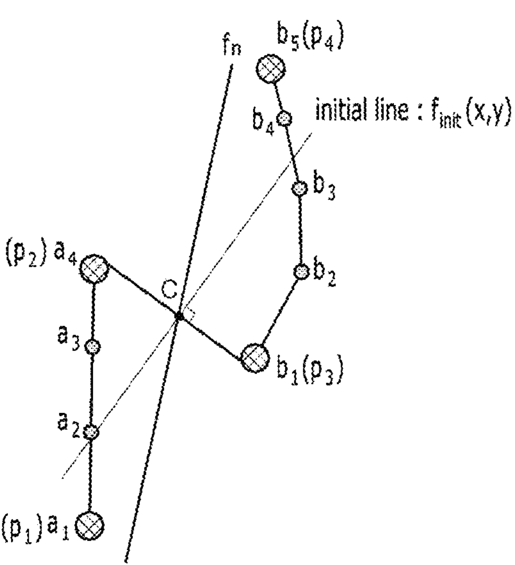
Figure 20:
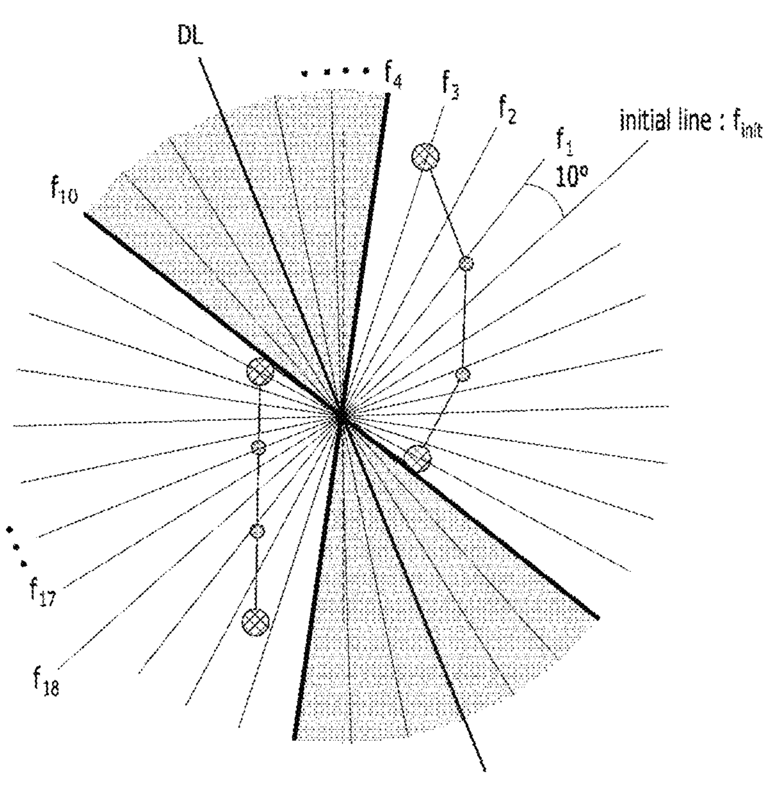

FIGS. 17A-17B are diagrams for describing a method of grouping point data and then sampling the grouped point data in steps S310 and S312, FIG. 18 is a diagram for describing a method of determining a reference line in steps S410 and S420, FIG. 19 is a diagram for describing a method of selecting a separation reference line by selecting a separable angular region in steps S430 and S440, and FIG. 20 is a diagram for describing a method of generating boxes by separating the point groups from each other in steps S510 and 520.

A method of grouping point data in step S310 and a method of sampling grouped point data in step S312 will be described with reference to FIGS. 17A-17B. Point data constituting a contour extracted from an object may include four peak points P1 to P4 including a start point P1, an end point P4, and both end points P2 and P3 of a segment with a small point distribution.

Referring to FIG. 17A, point data may be divided into two groups based on the peak points P2 and P3 in the middle region among the four peak points P1 to P4. The peak points P2 and P3 may be peak points selected due to a point data distribution less than a reference in the segment connecting P2 and P3. Since there may be a significantly small amount of point data between P2 and P3, the corresponding region may be most likely to include no object. That is, it may be estimated that P2 and P3 may be points of different objects, and the segment connecting P2 and P3 may be a segment connecting the two objects. Accordingly, point data may be divided into two groups based on P2 and P3. A group of points constituting a contour connecting P2 to P1 may be set as a group A, and a group of points constituting a contour connecting P3 to P4 may be set as a group B.

When the point groups (group A and group B) may be set, points may be sampled in each point group in order to conserve system resources in the subsequent processing procedure. During point sampling, the start and end points of the contour of the corresponding group, and some of the points included in the middle contour region may be sampled. For example, point sampling may be performed in such a manner that only half of the points of the group A including P1 and P2 may be sampled, and only half of the points of the group B including P3 and P4 may be sampled. FIG. 17B is a diagram illustrating a result of sampling point data of the group A and the group B. After sampling the point data of the group A and the group B, two objects may be separated by setting a reference line for separating the two groups.

A method of selecting an initial angle for separating two groups in step S410 will be described with reference to FIG. 18.

The contour of the group A includes peak points a1(P1) and a4(P2) and sampled points a2 and a3. The contour of the group B includes peak points b1(P3) and b5(P4) and sampled points b2, b3, and b4.

The contour of the group A and the contour of the group B may be connected by a line connecting the peak point a4(P2) of the group A and the peak point b1(P3) of the group B. The peak points a4(P2) and b1(P3) may be peak points selected due to point data distributions less than the reference on the segment connecting a4(P2) and b1(P3), and it may be estimated that two objects may be connected by a contour connecting a4(P2) to b1(P3). Accordingly, a "separation reference line" for separating the two groups may be searched based on the midpoint C of a4(P2) and b1(P3).

To extract the separation reference line, first, an initial line passing through the midpoint C of a4(P2) and b1(P3) and perpendicular to a straight line passing through a4(P2) and b1(P3) may be set. An angle formed between the initial line and a heading of an object to be separated, that is, an object recognized by all point data, may be set as an initial angle.

A method of determining a line by which two groups may be separated in step S420 will be described with reference to FIG. 19.

In order to determine whether a straight line f passing through the midpoint C of a4(P2) and b1(P3) may be a line by which the group A and the group B may be separated, it may be determined whether the straight line f passes through the points of the group A and the group B.

If the straight line f does not pass through the points a1 to a4 and b1 to b5 of the group A and the group B while passing through the midpoint C, the straight line f may be selected as a "candidate for a line for separation". Further, the angle of the straight line f selected as a candidate for a line for separation may be selected as a "candidate for an angle for separation".

Therefore, when the straight line of the initial line may be represented by a function $f_{init}(x, y)$, the points of the group A may be represented by $a_i(x_i,y_i)$, and the points of the group B may be represented by $b_j(x_j,y_j)$, the function of a candidate for a line for separation satisfies the following formulas for all of i and j.

$$f(x_i,y_i)*f(x_{i+1},y_{i+1})>0$$

$$f(x_j,y_j)*f(x_{j+1},y_{j+1})>0$$

A method of selecting a separable angular region in step S430 and a method of selecting a "separation reference line" in step S440 will be described with reference to FIG. 20.

To select the separable angular region, the angle of the straight line f is rotated by a certain angle from the initial line.

The initial line is a straight line passing through the midpoint C of a4(P2) and b1(P3) and perpendicular to a line passing through a4(P2) and b1(P3). The straight line f may be set such that an angle formed with the initial line increases by a certain angle, for example, 10°, while passing through the midpoint C of a4(P2) and b1(P3). Therefore, the angle of the straight line f can be increased in such a manner that an angle between a first straight line $f_1$ and the initial line becomes 10°, an angle between a second straight line $f_2$ and the initial line becomes 20°, an angle between a third straight line $f_3$ and the initial line becomes 30°, and so on. If the angle may be increased by 10°, an 18th straight line $f_{18}$ has an angle of 180° with the initial line, and thus straight lines may be set for all angles at intervals of 10° based on the initial line. It may be possible to select "candidates for a line for separation" $f_4$ to $f_{10}$ by performing step S420 of determining whether the straight lines $f_1$ to $f_{18}$ set through the above process may be straight lines by which the two groups may be separated. Accordingly, a region defined by $f_4$ to $f_{10}$ may be determined as a separable angular region.

The separation reference line DL may be determined as a line having the average value of the slopes of the two straight lines $f_4$ and $f_{10}$ corresponding to the boundary of the separable region as a slope, and passing through the midpoint C of a4(P2) and b1(P3).

When the separation reference line DL may be determined, the area may be divided into the region of the group A and the region of the group B based on the separation reference line DL and the object may be recognized for each region.

Figure 21:
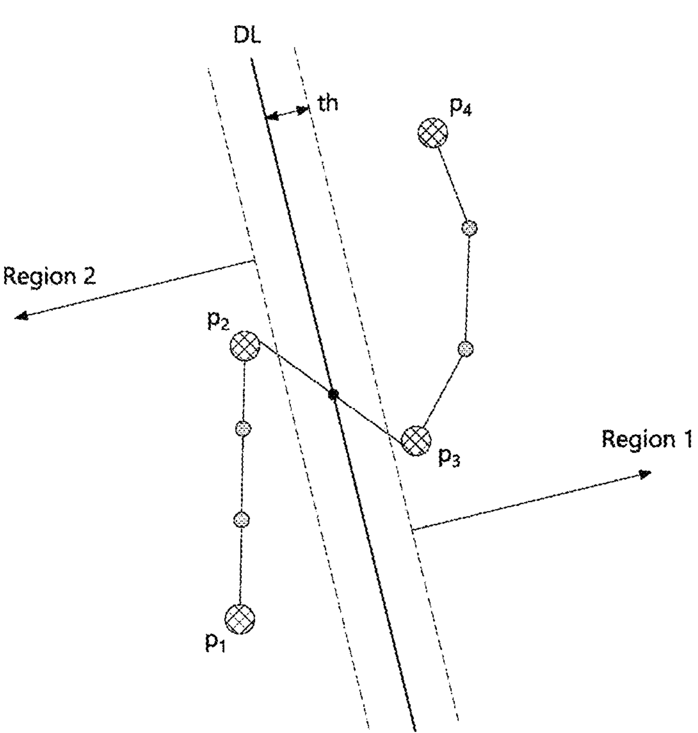

A method of deleting and separating points for each region in step S510 will be described with reference to FIG. 21.

In order to separate two regions, all points included in the object may be searched based on the separation reference line DL. Thereafter, all point data within a reference distance th with respect to the separation reference line DL may be deleted to separate a first region and a second area. Here, the reference distance th may be a distance set in order to improve accuracy at the time of recognizing the point data of both regions as respective objects by removing points located at the boundary between the first region and the second region, and may be set to, for example, "0.25*(length of segment $\overline{P2P3}$)". However, it is not limited thereto.

Figure 22:
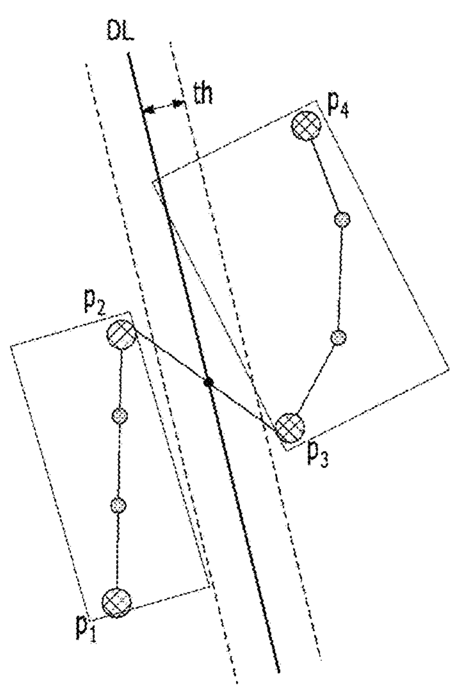

A method of generating a bounding box and a contour for each region in step S520 will be described with reference to FIG. 22.

After removing points located at the boundary with respect to the separation reference line DL, the point data located in the first region and the point data located in the second region may be respectively clustered. Thereafter, the object of the first region and the object of the second region may be recognized by generating bounding boxes and contours fitted to the clustered point data.

FIGS. 23A-23B and 24A-24B are simulation results of the object detection method according to an embodiment.

Figure 23A:
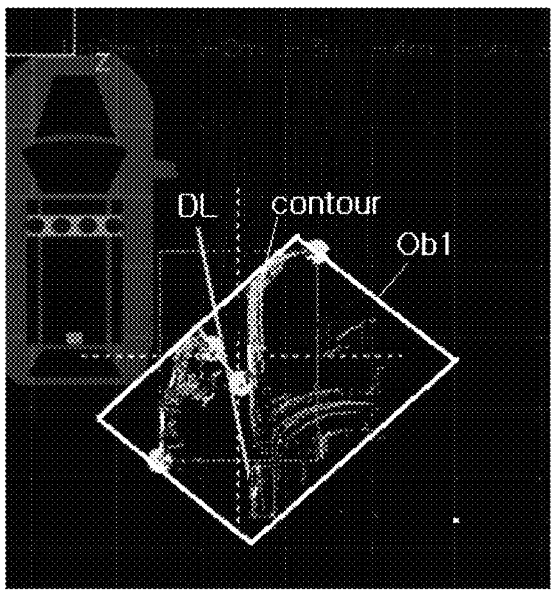
FIGS. 23A-23B and 24A-24B are simulation results of the object detection method according to an embodiment.

FIG. 23A illustrates an example in which point data obtained from a part of a passenger vehicle and point data of a two-wheeled vehicle may be recognized as one object Ob1. In the embodiment of FIG. 23A, the contour of the misrecognized object Ob1 has two break points. Accordingly, the contour may be divided into two regions by determining a separation reference line DL passing between the two break points.

Figure 23B:
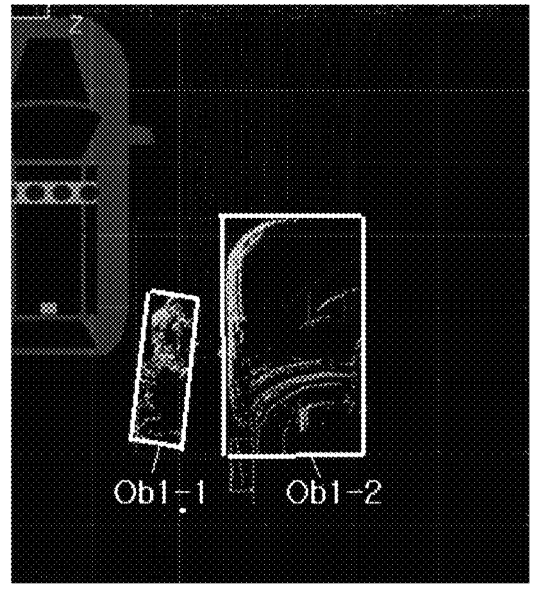

FIG. 23B illustrates a result of clustering the point data separated into two regions based on the separation reference line DL to separate the same into two objects Ob-1 and Ob-2.

Figure 24A:
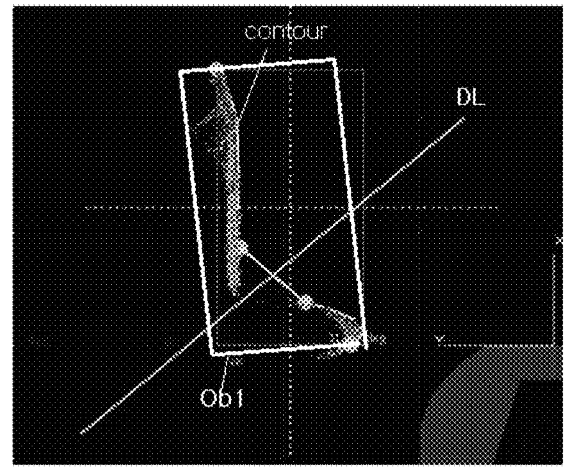

FIG. 24A shows an example in which the contour of the misrecognized object Ob1 has one break point in the case where the point data obtained from the two objects may be misrecognized as one object Ob1. In the case where the contour has one break point, it may be possible to find a contour line having the lowest density of points among contour lines connecting points on the contour and set a separation reference line DL for dividing the corresponding contour line.

Figure 24B:
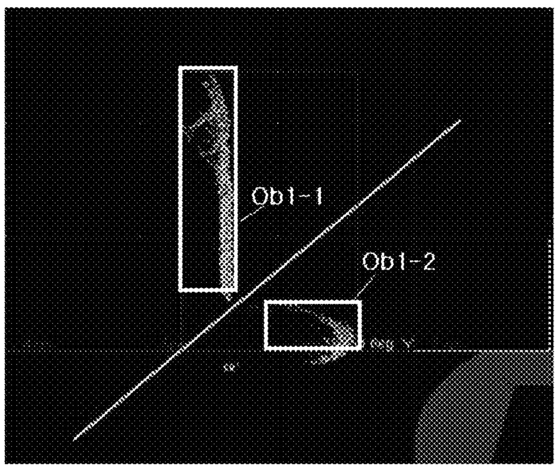

FIG. 24B illustrates a result of clustering the point data separated into two regions based on the separation reference line DL to separate the same into two objects Ob-1 and Ob-2.

As described above, in the present embodiment, when it may be determined that two objects among objects clustered as dynamic objects may be misrecognized as one object, contour characteristics of the corresponding object may be analyzed to detect a part where the two objects may be connected and the object may be separated into the two objects, to improve accuracy of object recognition.

Although the embodiment has been mainly described, this may be merely an example and does not limit the present disclosure, and those of ordinary skill in the art to which the present disclosure pertains will appreciate that various modifications and applications which may not be exemplified above may be possible without departing from the essential characteristics of the present embodiment. For example, each component specifically represented in the embodiment may be modified. Differences related to such modifications and applications should be construed as being included in the scope of the present disclosure defined in the appended claims.

What is claimed is:

1. An object detection method of a vehicle lidar system, comprising:
- receiving point data from a lidar sensor;
- determining an object to be separated from the point data;
- forming a contour of the object by connecting peak points among point data of the object;
- determining a contour line in the contour of the object, a connecting section of which includes point data less than or equal to a reference; and
- setting a separation reference line crossing the contour line for separating the contour of the object into two regions to recognize point data of the two regions as respective objects.

2. The object detection method of claim 1, further comprising:
- generating the contour based on all point data included in the object to be separated;
- selecting objects in which at least a part of the contour is included in a region of interest (ROI) of a host vehicle;
- selecting objects having sizes equal to or greater than a reference size among the objects included in the region of interest (ROI) of the host vehicle; and
- selecting an object having one or more points between a first point and an end point of the contour among the objects having sizes equal to or greater than the reference size as the object to be separated.

3. The object detection method of claim 1, wherein the determining of the contour line including the point data equal to or less than the reference comprises:
- determining a break point included in the contour of the object to be separated;
- determining, based on the break point, a first peak point and a second peak point connecting the contour line including the point data equal to or less than the reference; and
- extracting a first point, an end point, and the first and second peak points of the contour of the object to be separated as four peak points.

4. The object detection method of claim 3, wherein the determining of a break point included in the contour of the object to be separated comprises:
- determining whether a straight line connecting the first point and the end point of the contour of the object to be separated is a diagonal line;
- checking whether points of the contour of the object to be separated are present in one direction with respect to the diagonal line;
- selecting a point farthest from the first point and the end point as a first peak point candidate;
- calculating a variance of distances between the straight line connecting the first point and the first peak point and points on the contour of the object to be separated present between the first point and the first peak point and calculating a variance of distances between the straight line connecting the first peak point and the end point and points on the contour of the object to be separated present between the first peak point and the end point; and
- determining that the contour of the object to be separated has two break points if variance values of the straight line connecting the first point and the first peak point and the straight line connecting the first peak point and the end point are within a range of variance threshold values of reference lines and a range of variance threshold values of non-reference lines, respectively.

5. The object detection method of claim 4, wherein the determining of the first peak point and the second peak point connecting the contour line including the point data equal to or less than the reference based on the break point comprises determining whether the contour line including point data equal to or less than the reference is present for the contour of the object to be separated in a linear direction having a larger variance value based on the first peak point upon determining that the contour of the object to be separated has the two break points.

6. The object detection method of claim 3, wherein, if there is one break point included in the contour of the object to be separated, determining whether a shape of the contour of the object to be separated defined by the break point satisfies a concave shape with respect to a host vehicle comprises:
- calculating a variance of distances between a straight line connecting the first point of the contour of the object to be separated and the break point and points on the contour of the object to be separated present between the first point and the break point, and calculating a variance of distances between a straight line connecting the break point and the end point and points on the contour of the object to be separated present between the break point and the end point, with respect to the object to be separated which satisfies the concave shape; and determining whether the contour line including point data equal to or less than the reference for the contour of the object to be separated is in a linear direction having a smaller calculated variance value.

7. The object detection method of claim 3, wherein the determining of a first peak point and a second peak point connecting a contour line including point data less than or equal to the reference based on the break point comprises:

dividing the contour line formed by the two points into a plurality of regions in a direction parallel to the contour line based on the break point; and determining the two points forming the corresponding contour line as the first peak point and the second peak point if a number of regions having no point data among the plurality of regions is equal to or greater than a reference value.

8. The object detection method of claim 3, wherein the setting of a separation reference line for separating the contour of the object to be separated into two regions while passing through the contour line including the point data equal to or less than the reference to recognize point data of the two regions as respective objects comprises:

setting points included in a contour connected from the first point of the contour of the object to be separated to the first peak point as a first point group;

setting points included in a contour connected from the second peak point to the end point of the contour of the object to be separated as a second point group; and selecting a straight line passing through a midpoint of the first peak point and the second peak point and not passing through the points of the first point group and the second point group as the separation reference line.

9. The object detection method of claim 8, wherein the selecting of the separation reference line comprises:

setting at least two straight lines passing through midpoint of the first peak point and the second peak point and not passing through the points of the first point group and the second point group as separation reference line candidates; and selecting, as the separation reference line, a straight line having an average value of slopes of a straight line having a largest slope and a straight line having a smallest slope among the separation reference line candidates.

10. The object detection method of claim 8, wherein recognizing of the point data of the two regions as respective objects comprises:

deleting point data within a reference distance from the separation reference line;

grouping the point data of a first region of the two regions and the point data of a second region of the two regions divided by the separation reference; and recognizing a first object based on the point data of the first region and recognizing a second object based on the point data of the second region.

11. The object detection method of claim 1, wherein the determining of a contour line in which a connection section of a contour line connecting the peak points includes point data equal to or less than a reference comprises determining a contour line having a lowest density of point data among contour lines connecting the peak points.

12. A non-transitory computer-readable recording medium having recorded thereon a program for executing an object detection method of a vehicle lidar system, the program implementing:

receiving point data from a lidar sensor;

determining an object to be separated from the point data, forming a contour of the object by connecting peak points among point data of the object;

determining a contour line, in the contour of the object, a connecting section of which includes point data less than or equal to a reference; and setting a separation reference line crossing the contour line for separating the contour of the object into two regions while to recognize point data of the two regions as respective objects.

13. A vehicle lidar system comprising:

a lidar sensor; and an object tracking device configured to:

recognize objects based on point data obtained through the lidar sensor;

upon determining an object to be separated among the objects, determine, a contour line, in a contour of the object formed by connecting peak points among point data of the object, a connecting section of which includes point data less than or equal to a reference; and set a separation reference line crossing the contour line for separating the contour of the object into two regions to recognize point data of the two regions as respective objects.

14. The vehicle lidar system of claim 13, wherein the object tracking device is configured to generate a contour based on all point data included in the recognized objects, select objects in which at least a part of the contour is included in a region of interest (ROI) of a host vehicle, select objects having sizes equal to or greater than a reference size among the objects included in the region of interest (ROI) of the host vehicle, and select an object having one or more points between a first point and an end point of the contour among the objects having sizes equal to or greater than the reference size as the object to be separated.

15. The vehicle lidar system of claim 13, wherein the object tracking device is configured to determine a break point included in the contour of the object to be separated, determine, based on the break point, a first peak point and a second peak point connecting the contour line including the point data equal to or less than the reference, and extract a first point, an end point, and the first and second peak points of the contour of the object to be separated as four peak points.

16. The vehicle lidar system of claim 15, wherein the object tracking device is configured to divide the contour line formed by the two points into a plurality of regions in a direction parallel to the contour line based on the break point and determines the two points forming the corresponding contour line as the first peak point and the second peak point if a number of regions having no point data among the plurality of regions is equal to or greater than a reference value.

17. The vehicle lidar system of claim 15, wherein the object tracking device is configured to set points included in a contour connected from the first point of the contour of the object to be separated to the first peak point as a first point group, set points included in a contour connected from the second peak point to the end point of the contour of the object to be separated as a second point group, and select a straight line passing through a midpoint of the first peak point and the second peak point and not passing through the points of the first point group and the second point group as the separation reference line.

18. The vehicle lidar system of claim 17, wherein the object tracking device is configured to delete point data within a reference distance from the separation reference line, group the point data of a first region of the two regions and the point data of a second region of the two regions divided by the separation reference, recognize a first object based on the point data of the first region, and recognize a second object based on the point data of the second region.

* * * * *